(12) United States Patent
Kotov et al.

(10) Patent No.: US 11,111,343 B2
(45) Date of Patent: Sep. 7, 2021

(54) GELS AND NANOCOMPOSITES CONTAINING ANFS

(71) Applicant: The Regents of the University of Michigan, Ann Arbor, MI (US)

(72) Inventors: Nicholas A. Kotov, Ypsilanti, MI (US); Jian Zhu, Evanston, IL (US); Siu on Tung, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 98 days.

(21) Appl. No.: 16/067,498

(22) PCT Filed: Dec. 29, 2016

(86) PCT No.: PCT/US2016/069167
§ 371 (c)(1),
(2) Date: Jun. 29, 2018

(87) PCT Pub. No.: WO2017/117376
PCT Pub. Date: Jul. 6, 2017

(65) Prior Publication Data
US 2019/0085139 A1    Mar. 21, 2019

Related U.S. Application Data

(60) Provisional application No. 62/272,877, filed on Dec. 30, 2015.

(51) Int. Cl.
*C08J 5/04* (2006.01)
*C08L 77/10* (2006.01)
(Continued)

(52) U.S. Cl.
CPC ............ *C08J 5/046* (2013.01); *B29B 13/06* (2013.01); *B29B 15/08* (2013.01); *C08J 3/075* (2013.01);
(Continued)

(58) Field of Classification Search
CPC ......... B29B 13/06; B29B 15/08; B82Y 40/00; B82Y 30/00; C08J 2363/00; C08J 3/075;
(Continued)

(56) References Cited

U.S. PATENT DOCUMENTS

| 5,573,579 | A | * | 11/1996 | Nakanishi | F16D 69/026 |
| | | | | | 106/36 |
| 2010/0090153 | A1 | * | 4/2010 | Stevenson | B32B 15/14 |
| | | | | | 252/62 |

(Continued)

FOREIGN PATENT DOCUMENTS

| CN | 103802411 | 5/2014 |
| CN | 103937237 A | 7/2014 |

(Continued)

OTHER PUBLICATIONS

Cao et al., "Reactive Aramid Nanostructures as High-Performance Polymeric Building Blocks for Advanced Composites", Advanced Functional Materials, 23, 2013, pp. 2072-2080.

(Continued)

*Primary Examiner* — Camie S Thompson
(74) *Attorney, Agent, or Firm* — Lempia Summerfield Katz LLC

(57) ABSTRACT

Branched aramid nanofibers (ANFs) can be made by controlled chemical splitting of micro and macroscale aramid fiber by adjusting the reaction media containing aprotic component, protic component and a base. Branched ANFs have uniform size distribution of diameters in the nanoscale regime (below 200 nm) and high yield exceeding 95% of the nanofibers with this diameter. The method affords preparation of branched ANFs with 3-20 branches per one nanofiber and high aspect ratio. Branched ANFs form hydrogel or aerogels with highly porous 3D percolating networks (3DPNs) frameworks that are made into different shapes. Polymers and nanomaterials are impregnated into the (Continued)

Figure 1:
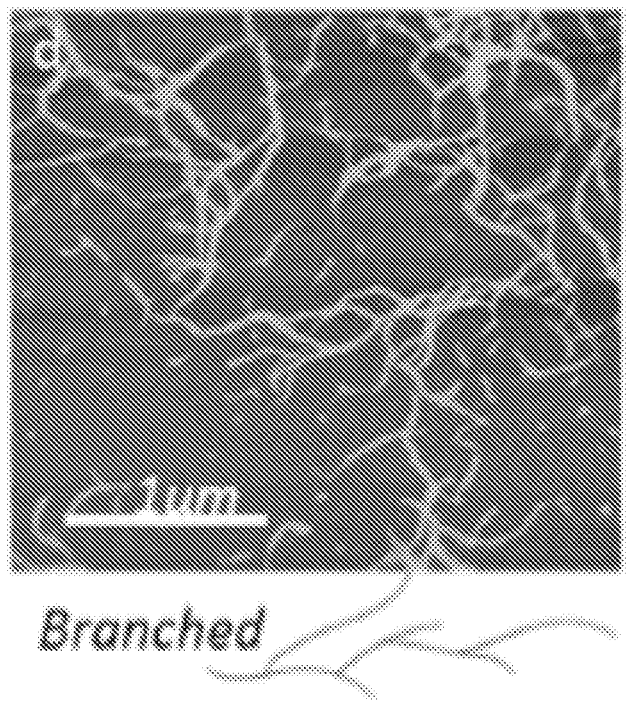

3DPNs through several methods. Gelation of branched ANFs facilitates layer-by-layer deposition in a process described as gelation assisted layer-by-layer deposition (gaLBL). A method of manufacturing battery components including ion conducting membranes, separators, anodes, and cathodes is described. The method of manufacturing of materials with high mechanical performance based on branched ANFs and 3DPNs from them is disclosed.

8 Claims, 33 Drawing Sheets

(51) Int. Cl.

| | | |
|---|---|---|
| C08J 5/00 | (2006.01) | |
| C08J 5/18 | (2006.01) | |
| B29B 13/06 | (2006.01) | |
| B29B 15/08 | (2006.01) | |
| C08J 3/075 | (2006.01) | |
| C08K 9/00 | (2006.01) | |
| C08L 63/00 | (2006.01) | |
| C08L 77/06 | (2006.01) | |
| B82Y 40/00 | (2011.01) | |
| B82Y 30/00 | (2011.01) | |

(52) U.S. Cl.
CPC .............. *C08J 5/005* (2013.01); *C08J 5/18* (2013.01); *C08K 9/00* (2013.01); *C08L 63/00* (2013.01); *C08L 77/06* (2013.01); *C08L 77/10* (2013.01); *B82Y 30/00* (2013.01); *B82Y 40/00* (2013.01); *C08J 2363/00* (2013.01); *C08L 2203/20* (2013.01); *C08L 2205/16* (2013.01)

(58) Field of Classification Search
CPC ..... C08J 5/005; C08J 5/046; C08J 5/18; C08J 2477/10; C08J 5/006; C08J 3/076; C08L 2205/16; C08L 63/00; C08L 77/10
USPC ............................. 428/292.1, 339; 524/173
See application file for complete search history.

(56) References Cited

U.S. PATENT DOCUMENTS

| | | | |
|---|---|---|---|
| 2011/0008702 A1* | 1/2011 | Connor ............... | H01M 8/0282 429/468 |
| 2013/0288050 A1 | 10/2013 | Arruda et al. | |
| 2017/0062786 A1 | 3/2017 | Kotov et al. | |

FOREIGN PATENT DOCUMENTS

| | | |
|---|---|---|
| JP | H09324060 A | 12/1997 |
| JP | 2015071848 A | 4/2015 |
| WO | 2010104061 A1 | 9/2010 |
| WO | 2015127115 | 8/2015 |
| WO | 2017116598 | 7/2017 |

OTHER PUBLICATIONS

Extended European Search Report in European Patent Application No. 16882654.3, dated Aug. 7, 2019, 10 pages.
International Preliminary Report on Patentability in International Application No. PCT/US2016/064186, dated Jul. 12, 2018, 13 pages.
International Preliminary Report on Patentability in International Application No. PCT/US2016/069167, dated Jul. 12, 2018, 10 pages.
International Search Report and Written Opinion of the International Searching Authority in International Application No. PCT/US2016/064186, dated May 4, 2017, 13 pages.
International Search Report and Written Opinion of the International Searching Authority in International Application No. PCT/US2016/069167, dated May 4, 2017, 15 pages.
Jian Yao et al., "Electrospinning of p-Aramid Fibers", Macromolecular Materials and Engineering, 2015, pp. 1238-1245, vol. 300, No. 12.
Ming Yang et al., "Dispersions of Aramid Nanofibers: A New Nanoscale Building Block", ACS Nano, 2011, pp. 6945-6954, vol. 5, No. 9.
Motoyuki Iijima et al., "Non-Aqueous Colloidal Processing Route for Fabrication of Highly Dispersed Aramid Nanofibers Attached with Ag Nanoparticles and their Stability in Epoxy Matrixes", Colloids and Surfaces A: Physicochemical and Engineering Aspects, 2015, pp. 195-202, vol. 482.
Website, University of Michigan Chemical Engineering, Jun. 22, 2016, see p. 3, Project No. 16, http://web.archive.org/web/20160622133524/http://www.engin.umich.edu/che/research/opportunities/summer/kotov.
Zhenzong Shao et al., "Preparation of p-Aramid Aerogels Using Supercritical CO2", Sen'i Gakkaishi, 2014, pp. 233-239, vol. 70, No. 10.
Office Action in European Patent Application No. 16 882 654.3, dated May 11, 2020, 4 pages.
Office Action in European Patent Application No. 16 882 654.3, dated Dec. 18, 2020, 6 pages.
First Office Action in Chinese Patent Application No. 201680077038.6, dated Sep. 1, 2020, 23 pages (including English translation).
Office Action in Japanese Patent Application No. 2018-534621, dated Dec. 1, 2020, 8 pages (including English translation).
Second Office Action in Chinese Patent Application No. 201680077038.6, dated Apr. 30, 2021, 8 pages (including English language translation).

* cited by examiner

GELS AND NANOCOMPOSITES CONTAINING ANFS

CROSS-REFERENCE TO RELATED APPLICATIONS

This U.S. national phase application is based on International Application No. PCT/US2016/069167, which claimed the benefit of U.S. Provisional Application No. 62/272,877, filed on Dec. 30, 2015. The entire disclosures of the above applications are incorporated herein by reference. Priority benefit of these earlier filed applications is hereby claimed.

GOVERNMENT SUPPORT

This invention was made with government support under grants CBET1036672 and CBET0932823 awarded by the U.S. National Science Foundation. The government has certain rights in the invention.

INTRODUCTION

One-dimensional (1D) nanoscale components can form light-weight highly interconnected three dimensional percolated networks (3DPNs) with considerably improved physical properties, such as high mechanical and electrical performance in comparison to their non-percolating analogs. The designation of "percolating" means that there is a connected path through the network that extends in all three directions. Formation of 3DPNs can greatly increase the mechanical, electrical, optical, and biological properties of the material. However, 3DPNs are difficult to produce due to their collapse under capillary pressure and poor connectivity of the nanomaterials. 3DPNs are essential for load bearing structures and portable electronic devices.

Typical 1D nanomaterials, such as carbon nanotube, metal nanowires, or organic nanofibers, have a rod-like morphology. Their percolations are generally achieved through the direct contact with each other on the confined cross-area by limited molecule forces, which could be easily disrupted by mechanical disturbance, such as shearing or stretching.

High performance composite materials can be formed from 3DPNs in the form of hydrogel or aerogel by infiltration with polymers.(1, 2) However, the long times associating with diffusion of the polymers, incomplete penetration of polymers into nanopores. Furthermore, incorporation of the matrix components into produced 3DNs that complement the base high strength nanomaterials, is complicated by the immiscibility of solvents, incompatibility of properties, 3DPN collapse, phase separation, and other problems.

Layer-by-layer (LBL) assembly can avoid some of these problems and was shown to produces percolated nanocomposites from fibrous nanomaterials, distinctively high volume fractions of nanomaterials, and high uniformity of their distribution. However, LBL deposition often requires depositing one nanometer scale layer at a time. This deposition mode is also associated with the slow multilayer build-up. Methods of making high performance nanocomposites with LBL affording accelerated deposition will represent a substantial advantage in preparation of high performance composites.

Vacuum assisted filtration (VAF) is capable of faster assembly of nanocomposites than LBL when the composite film is in micron scale.(3, 4) However, this method brings about limitations exemplified by need for the two components to be dispersed in the same solvent, otherwise, bulk agglomeration and phase separation occur and preparation of VAF films become impossible. If the components are strongly attracted to each other (which is desirable for mechanical performance of the resulting composite film) microporous filter membrane used in filtration of the composites becomes plugged and the separation of the composite phase from the fluid phase becomes impossible.

SUMMARY

This invention teaches about the branched ANFs synthesized from Kevlar® microfibers. These branched ANFs serve as components for different 3DPNs forming them with and without other components and under a wide range of conditions. Branched ANFs readily form hydrogel or aerogels with highly porous frameworks with mechanical properties exceeding those from non-branched nanomaterials with higher elastic crystalline moduli. 3DPNs from ANFs can also be made into different shapes through controlling the assembly conditions.

Suspensions of branched aramid nanofibers (ANF or ANFs) can facilitate preparation of 3DPNs resolving the challenges mentioned above. The use of ANFs as one of the components in the LBL deposition can accelerate this process and lead to thicker films of high performance composites after smaller number of deposition cycles than the LBL deposition without ANFs. In an embodiment, polymers such as epoxy (EPX), are impregnated into the 3DPNs using LBL deposition process facilitated by ANF's ability to form gels. At the same time LBL affords nanocomposite fabrication with the control of the film structure and thickness. The prepared ANF/EPX composites are transparent, and can achieve an optimum ultimate strength of 505±47 MPa, toughness of 50.1±9.8 MJ/m$^3$, and close-to-zero thermal expansion.

Figure 4:
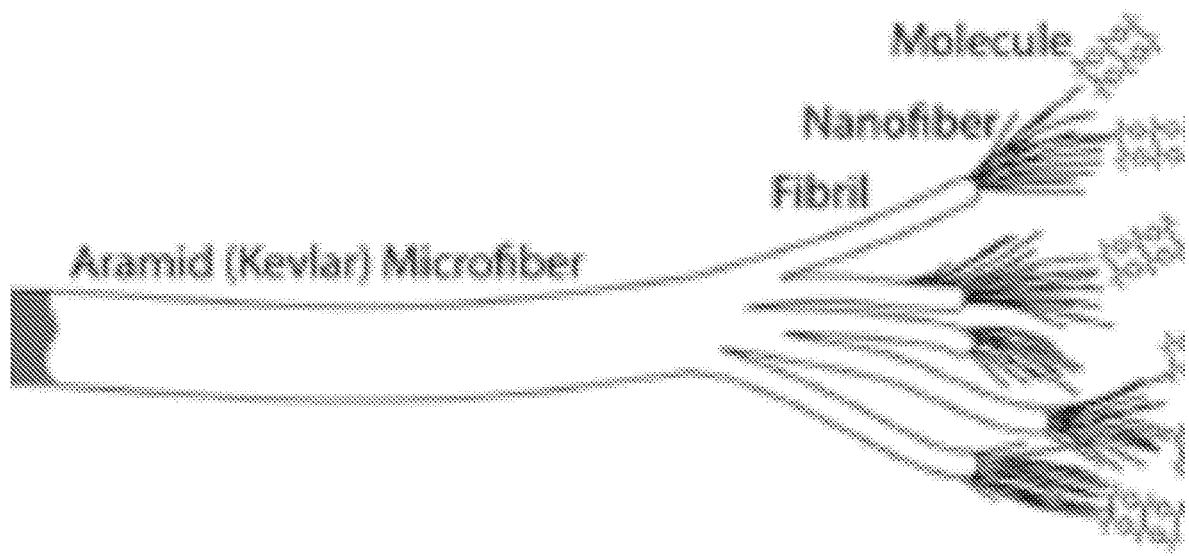
Figure 5:
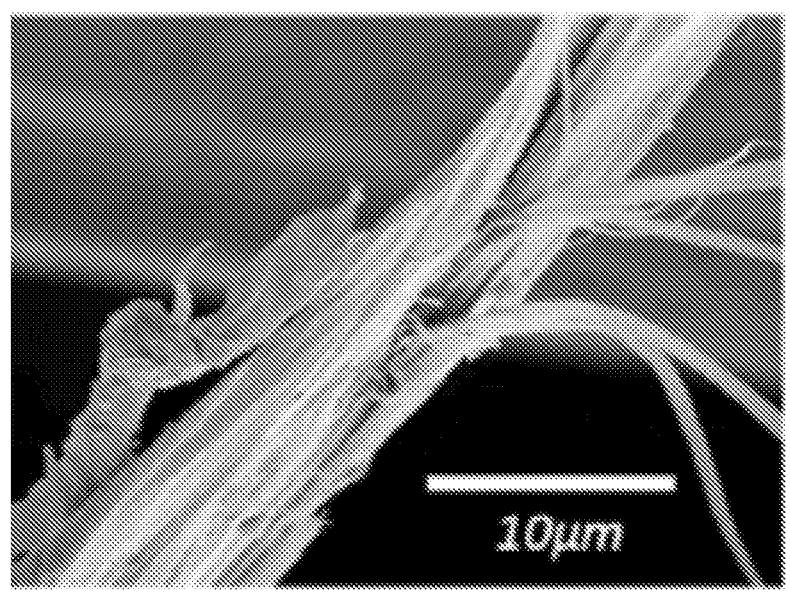

Branched ANFs can be obtained by controlled reaction of microfibers at low temperatures for extended times in aprotic solvent in the presence of a base at lower concentration, lower temperature or lower time than the formation of unbranched ANFs that represent the product of nearly full separation of microscale aramid fibers into fibrils. The intermediate state of chemical splitting of the microfibers into nanoscale fibrils is represented by branched ANFs; it is also a highly unusual morphology of nanofibers;

Branched ANFs are prepared at high yield, for example 98%, under disclosed conditions and have 2-20 branches. Atomic force microscopy (AFM) images of branched ANFs indicate that they have an average diameter of 4.5 nm and a total length of several micrometers (FIG. 1), which were further corroborated by transmission electron microscopy (TEM) in FIG. 2 and SEM images of branched ANFs in FIG. 3. The ability of ANFs to bifurcate, or branch, several times along its length is a reflection of hierarchical structural organization in Kevlar microfibers made of nanofilaments (FIGS. 4, 5).

The diameter of branched ANFs is in the range of 3-100 nm, with a narrow distribution not exceeding of 30% of the mean in the range specified above.

Figure 6:
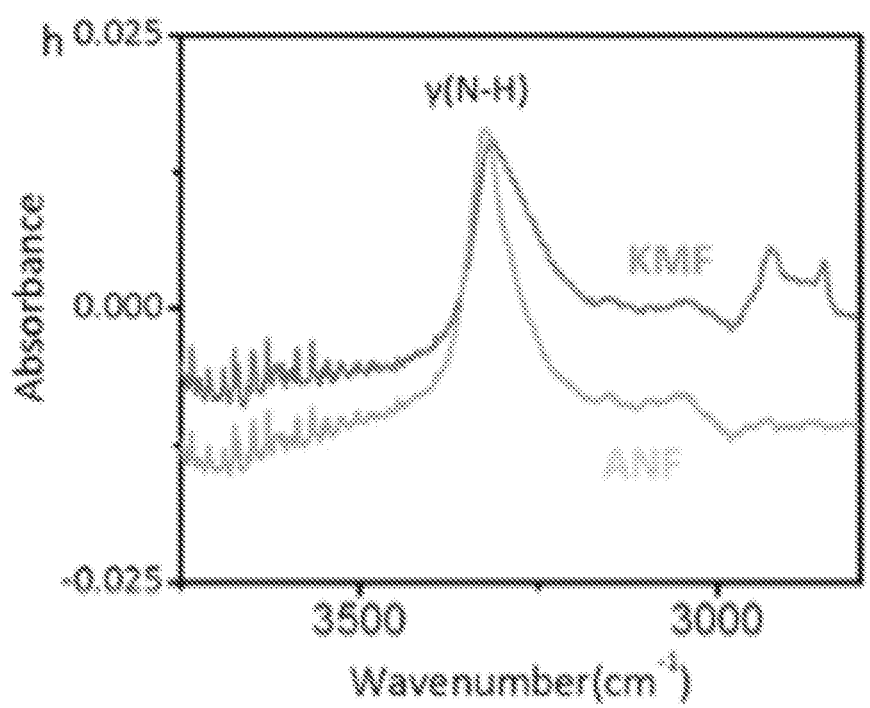
Figure 7:
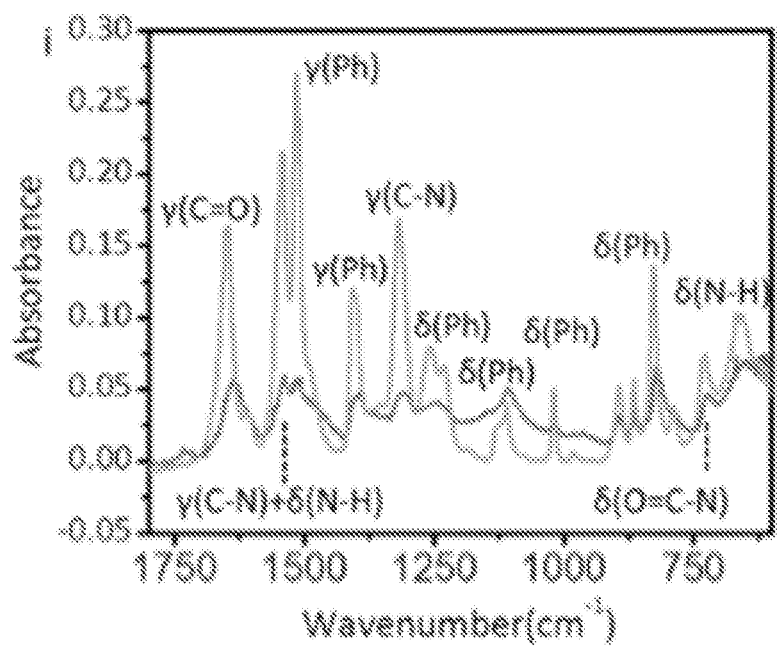
Figure 8:
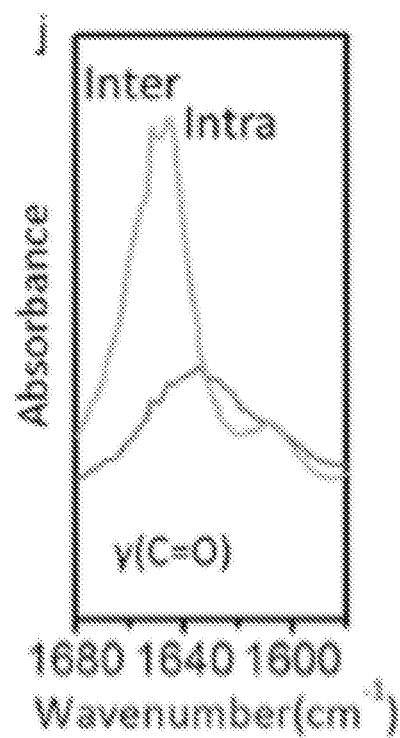

The chemical signature that differentiates the ANF from the aramid microfibers is an upshift of N—H and C=O stretching vibrations which is related to the hydrogen bonding environment (FIGS. 6, 7). The C=O vibration modes in the nanofiber is split into two peaks, which is induced by the intra- and inter-nanofiber hydrogen bonds in the ANFs (FIG. 8).

Branched ANFs can assemble into a robust 3DPNs better than other fibrous or particulate nanomaterials. Temperature and chemical stability of ANFs affords preparation of 3DPNs without network, collapse, phase separation, recrystallization, size segregation and other common problems associated with other 3DPNs. Furthermore, they can make robust gels that expand the range of solvents possible to use for matrix incorporation. ANFs gels can be used in LBL assembly thereby accelerating the process depositing a thicker film of finely structured nanocomposite.

By changing the conditions of the assembly, the 3DPNs from ANFs can be shaped differently and produced continuously. The adaptability of network making process enables a consistent way to fabricate nanocomposites with nanoscale level control.

[A1] BRIEF DESCRIPTION OF THE DRAWINGS

FIG. 1. AFM image of branched ANFs deposited on a silicon substrate.

Figure 2:
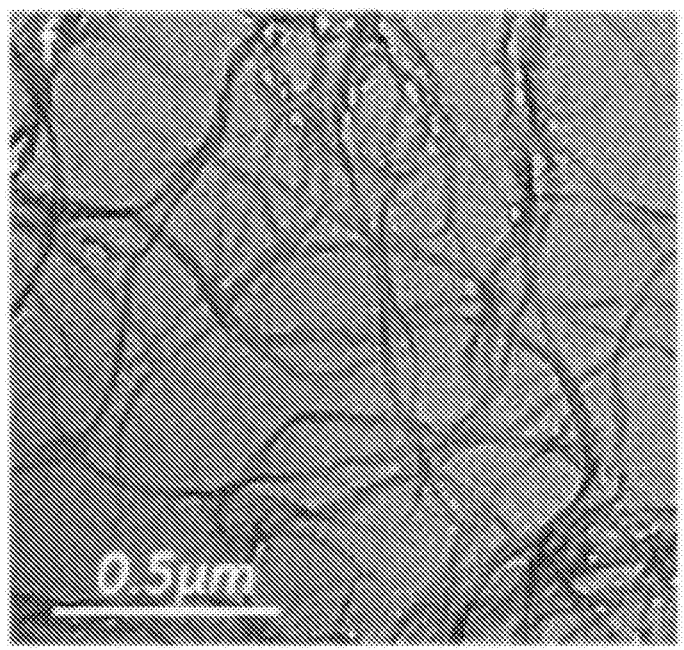

FIG. 2. TEM image showing the branched ANF.

Figure 3:
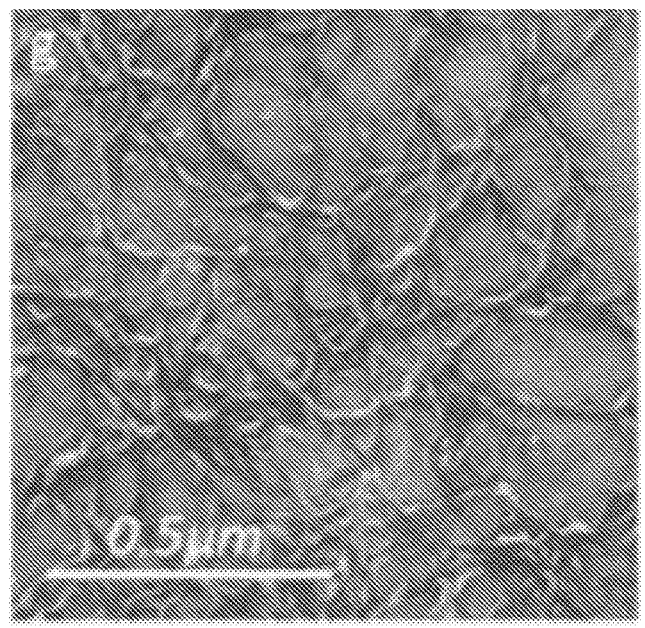

FIG. 3. SEM image of branched ANF.

FIG. 4. Schematic drawing of the hierarchical structure of Kevlar™ microfibers (KMF).

FIG. 5. SEM image of fractured KMF showing the fibrils and constitutive nanofibers.

FIGS. 6-8. FTIR spectra for KMF and ANF. The stretching and bending modes of different functional groups are indicated by γ and δ respectively.

Figure 9:
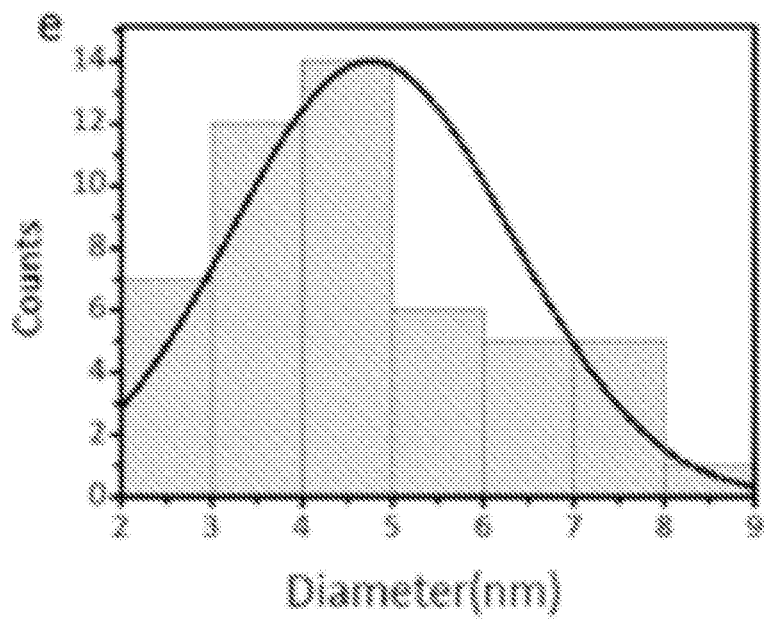

FIG. 9. Statistical analysis of ANF diameters obtained from multiple AFM images.

Figure 10:
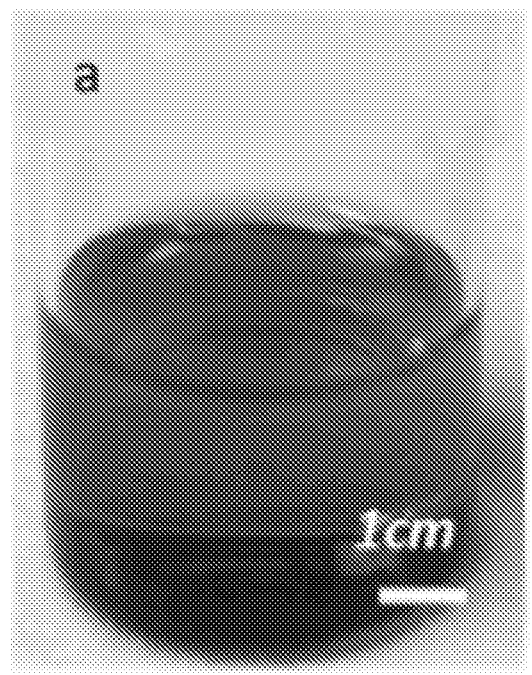

FIG. 10. Photograph branched ANF dispersion in DMSO-based reaction media.

Figure 11:
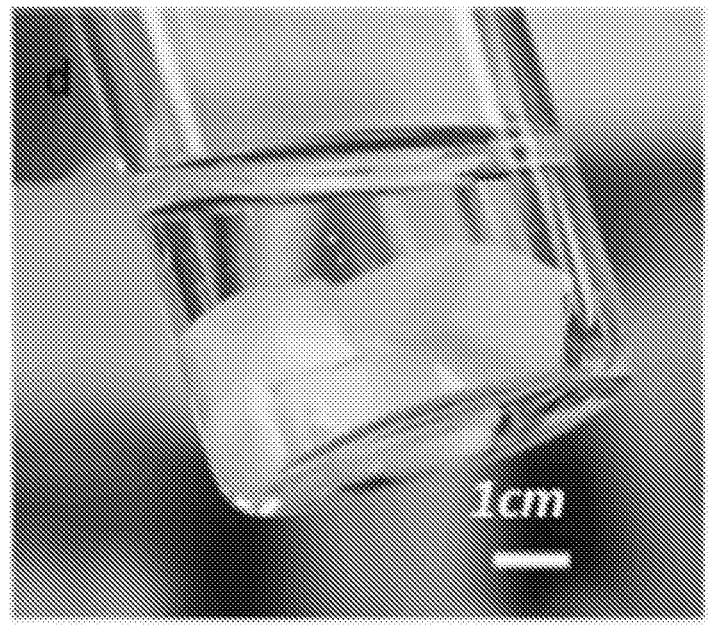

FIG. 11. Photograph of branched ANF hydrogel immersed in deionized water.

Figure 12:
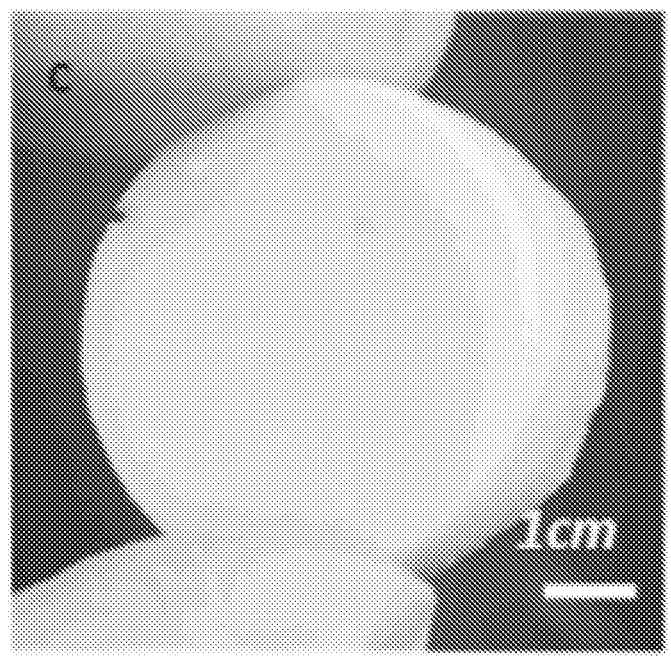

FIG. 12. Photograph of branched ANF aerogel.

Figure 13:
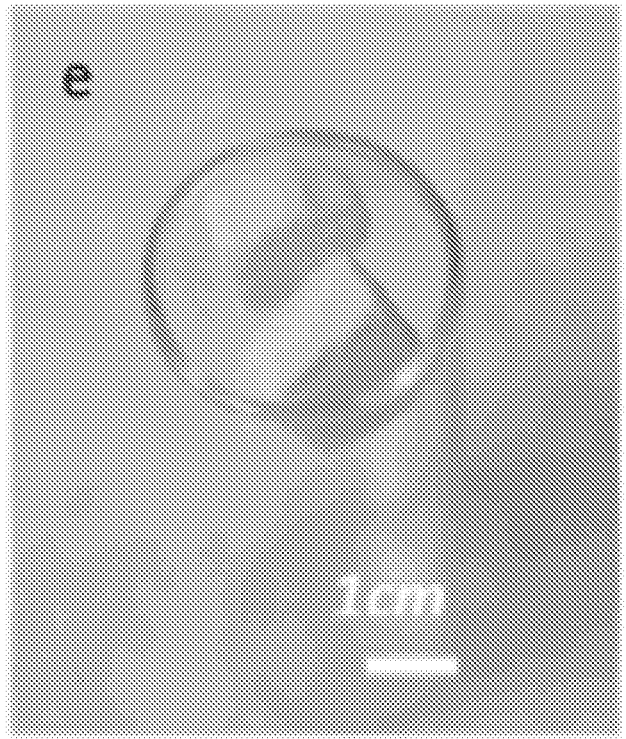

FIG. 13. Photograph of branched ANF pieces cut wedged in an opening of a beaker.

Figure 14:
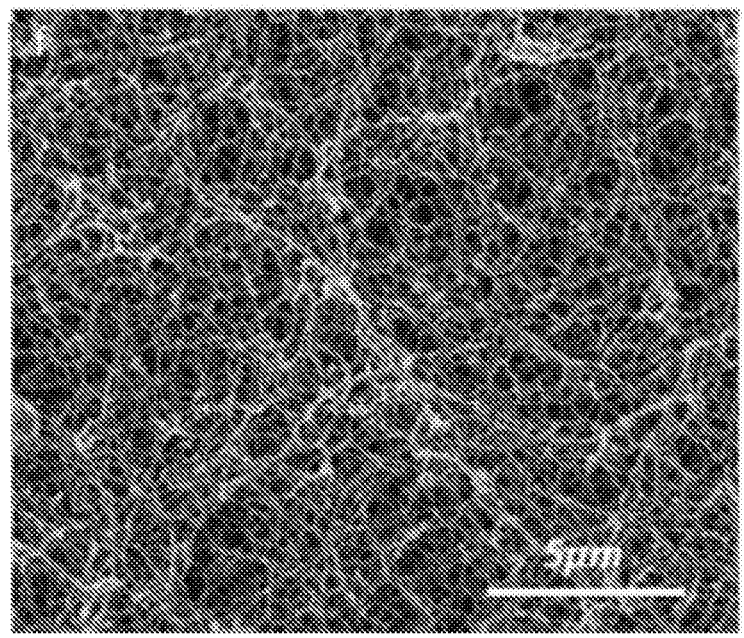

FIG. 14 SEM images of branched ANF aerogel

Figure 15:
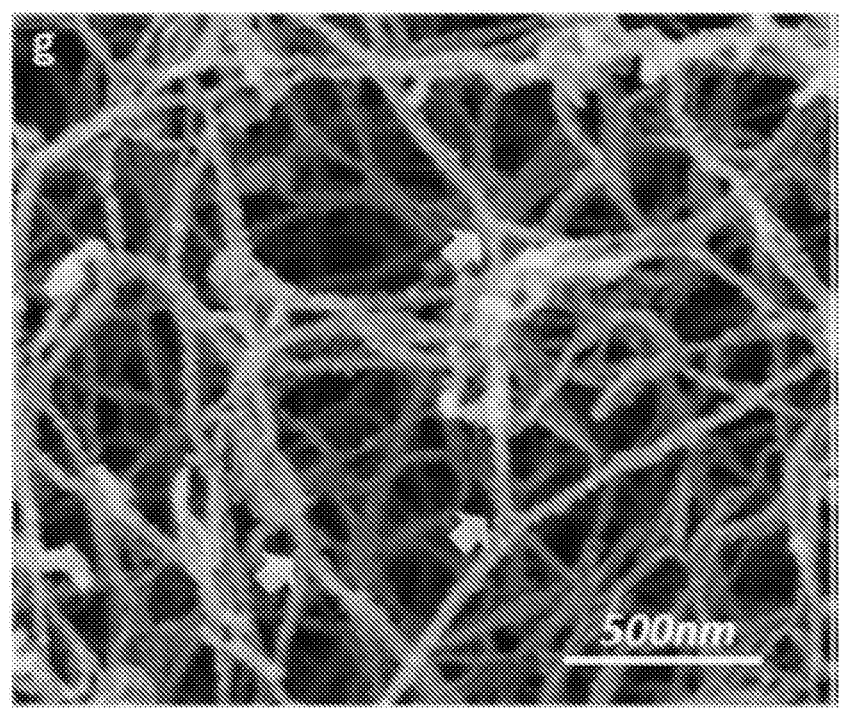

FIG. 15 Magnified SEM images of branched ANF aerogel

Figure 16:

FIG. 16. Photograph of the fibrous hydrogel jetting form a capillary glass tube.

Figure 17:
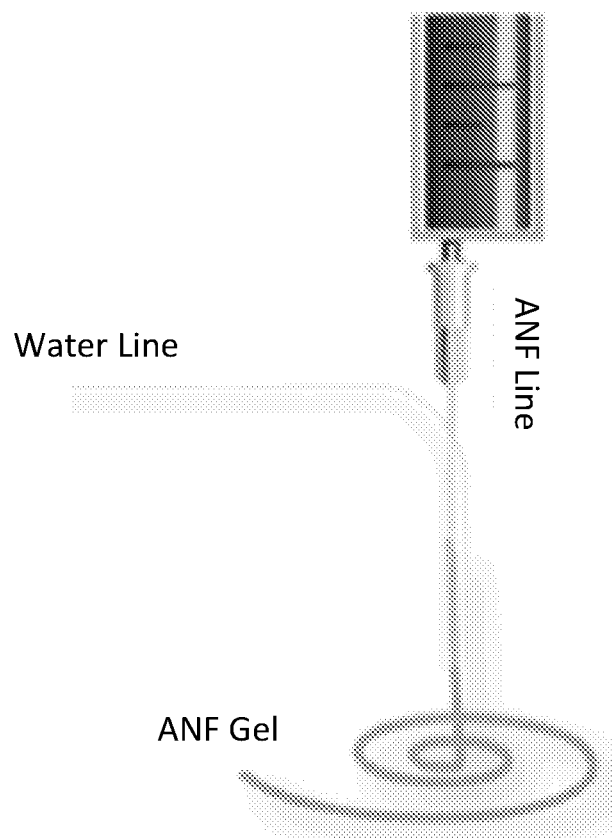

FIG. 17. Schematic showing the fibrous hydrogel production from branched ANFs process.

Figure 18:
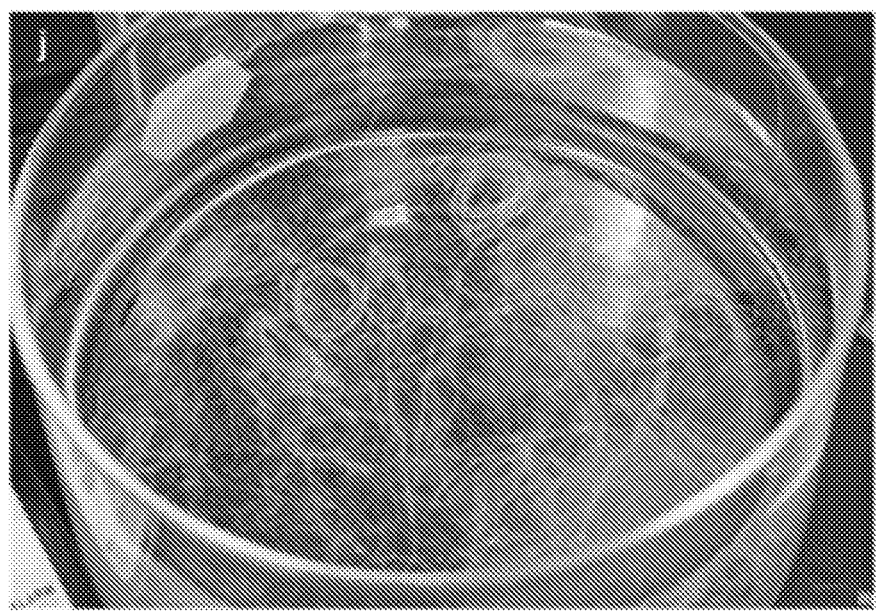

FIG. 18. Photograph of fibrous hydrogel collected in a beaker.

Figure 19:
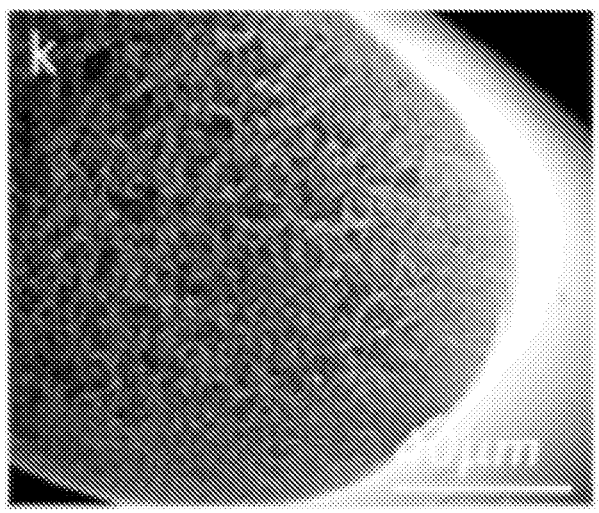

FIG. 19. SEM image of the fibrous aerogel converted from hydrogel by supercritical CO2 drying FIG. 20. Magnified SEM image showing the internal nanofiber networks.

Figure 21:
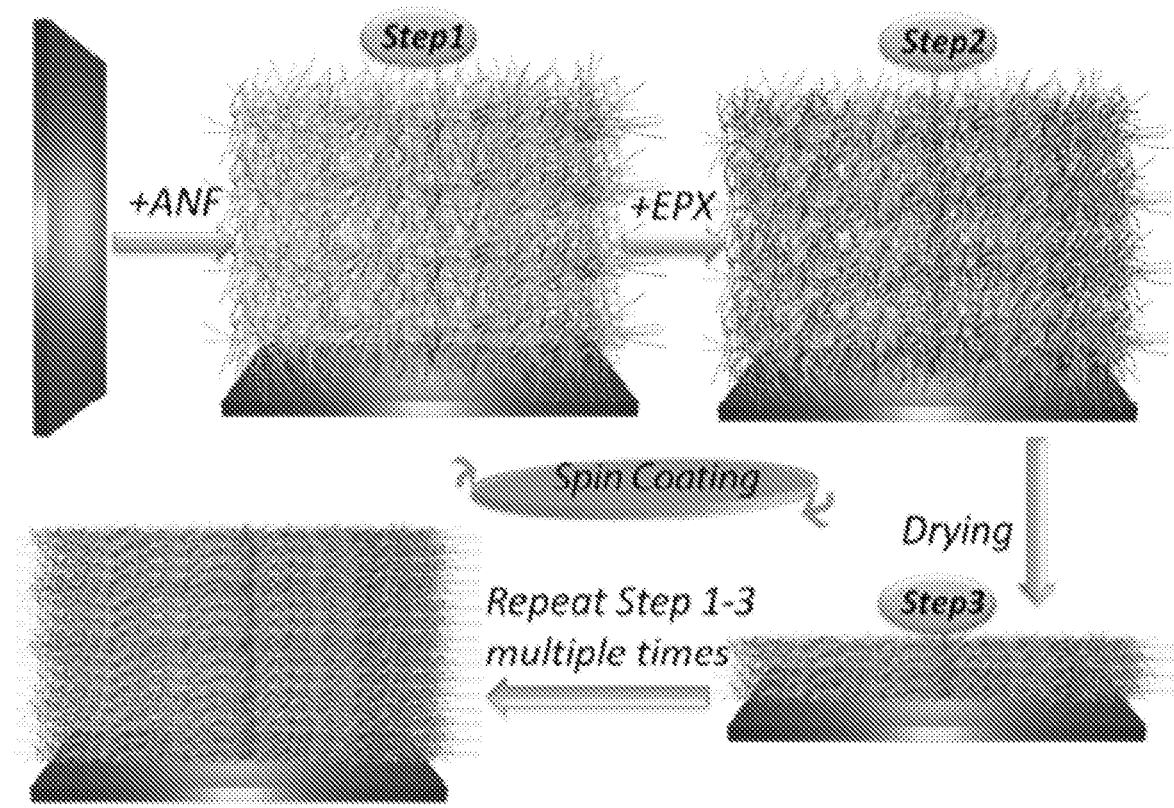

FIG. 21. Schematic of gelation-assisted layer-by-layer (gaLBL) deposition process FIG. 22. Photograph of the coated anode after step 6 described in the working example for ion conducting membranes. The top layer is the ANF composite (or ANF ICM), the dark layer underneath is the carbon electrode, the copper foil is the copper current collector. The carbon and copper collector are typical of a lithium ion battery anode.

Figure 23:
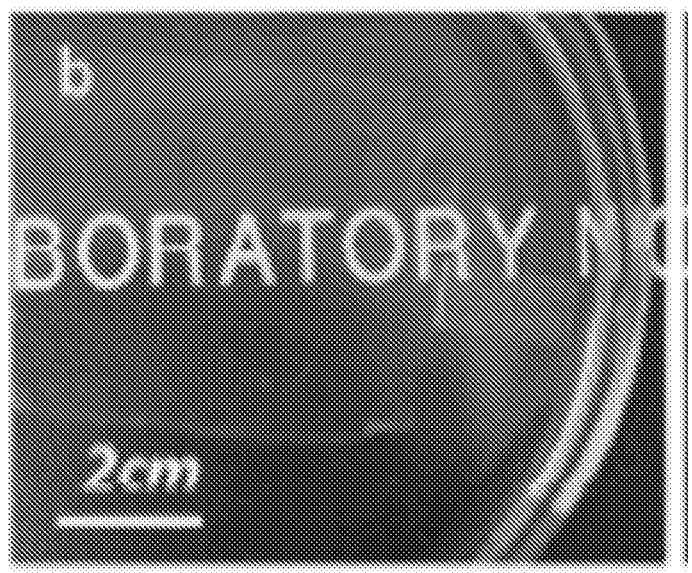

FIG. 23. Photograph of a thin layer of hydrogel peeled off from the glass slide and suspended in water.

Figure 24:
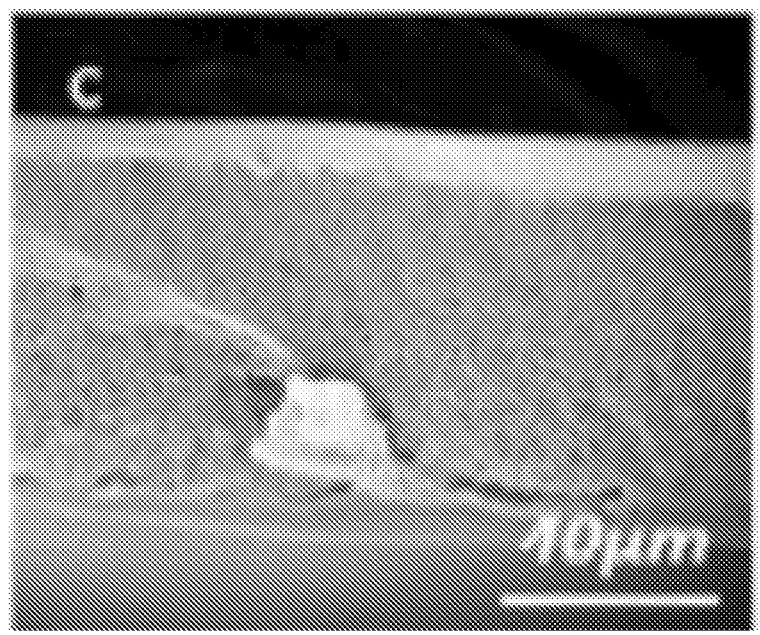

FIG. 24. Cross-section SEM image of a thin layer of aerogel obtained by $CO_2$ supercritical drying.

Figure 25:
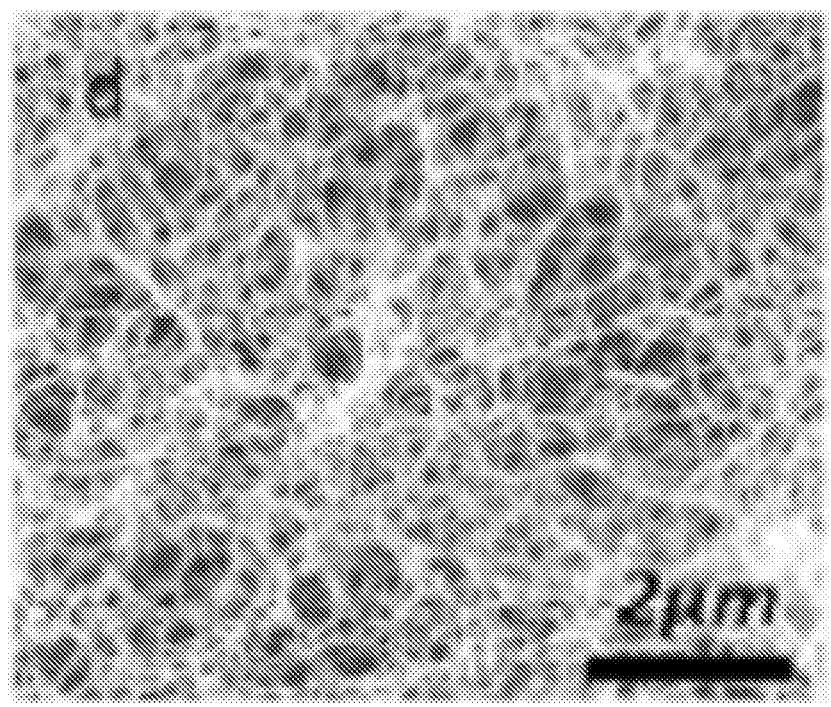

FIG. 25. Magnified region in FIG. 24 showing the porous nanofiber network.

Figure 26:
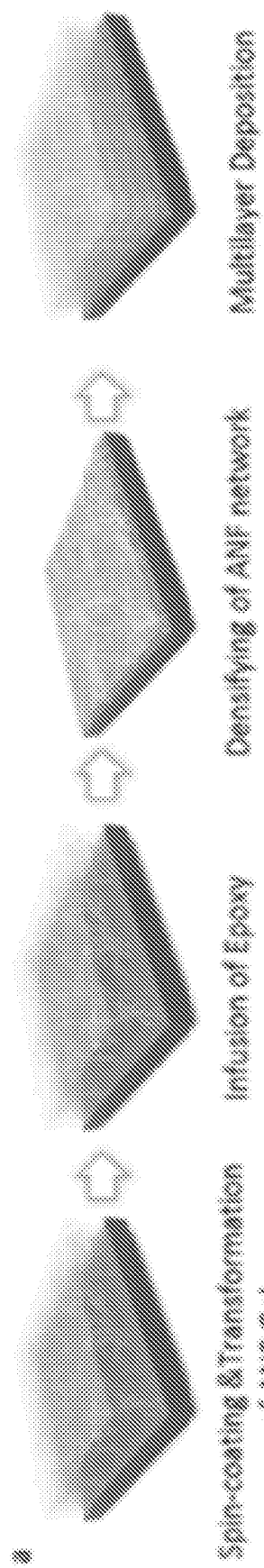

FIG. 26. Schematic of the LBL process.

Figure 27:
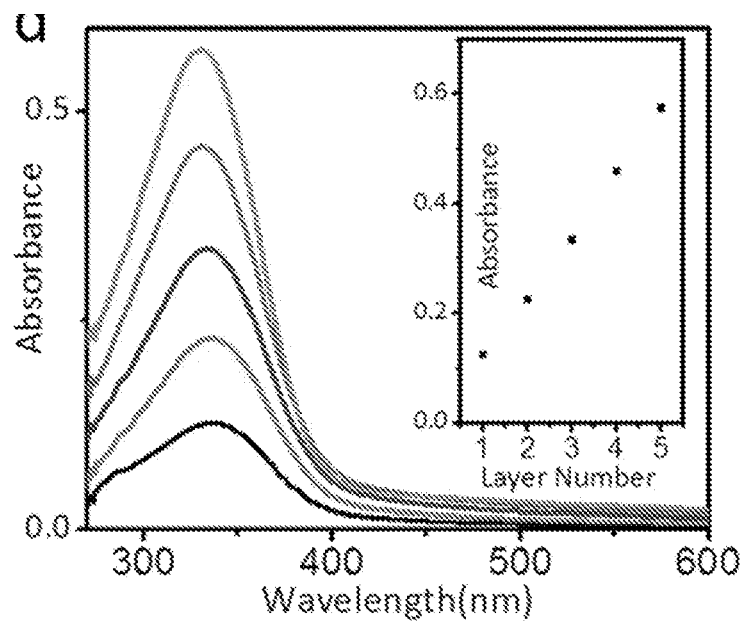

FIG. 27. Linear growth of the film examined by UV-vis spectroscopy. The inset shows the plot of absorbance at 330 nm vs. layer numbers.

Figure 28:
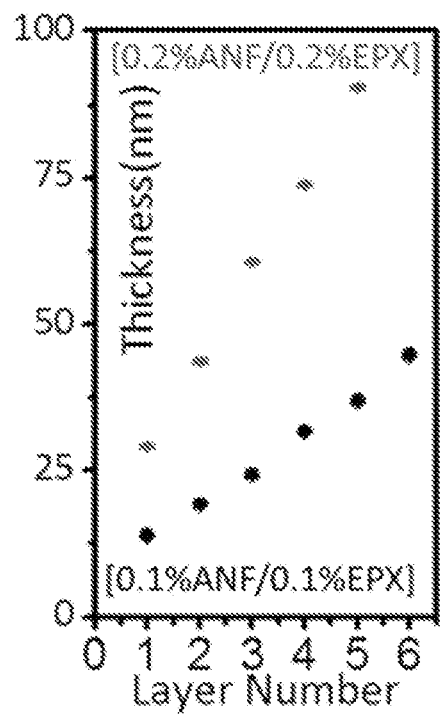

FIG. 28. Linear increase of the film thickness at the ANF and EPX concentrations of 0.1%, 0.2% determined by ellipsometry.

Figure 29:
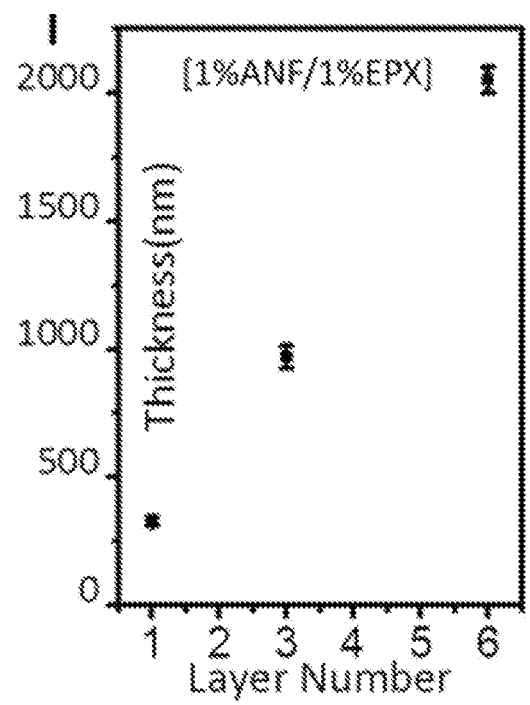

FIG. 29. Linear increase of the film thickness at the ANF and EPX concentrations of 1% determined by ellipsometry.

Figure 30:

FIG. 30. Photograph of 1% ANF/1% EPX]$_6$ on glass slide.

Figure 31:
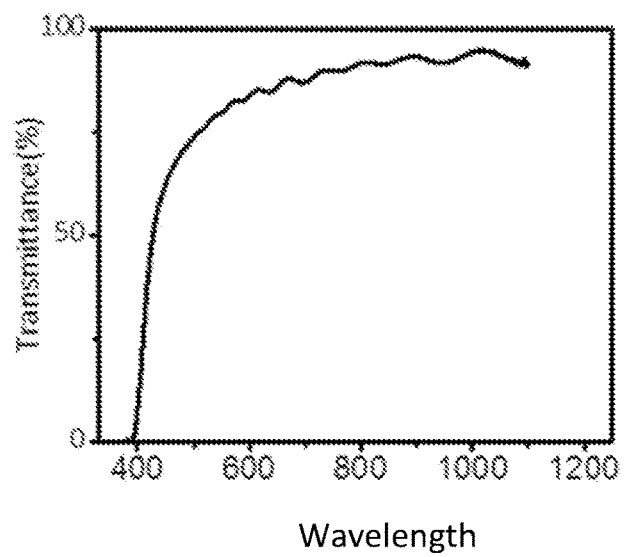

FIG. 31. UV-vis spectrum of [1% ANF/1% EPX]$_6$ film.

Figure 32:
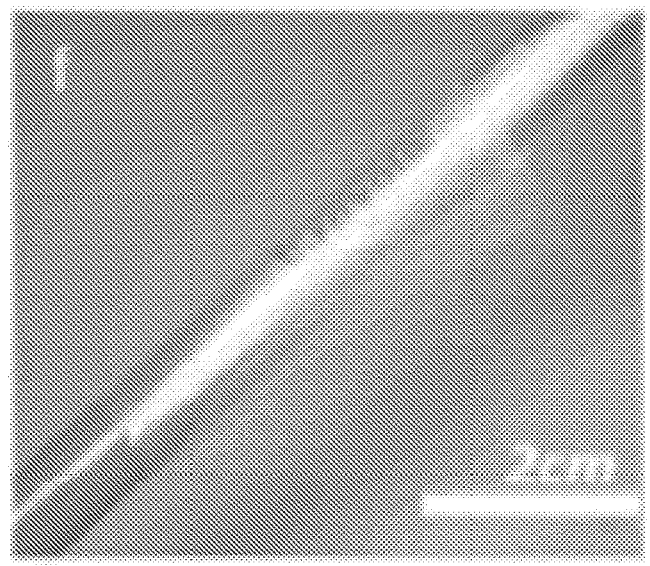
Figure 33:
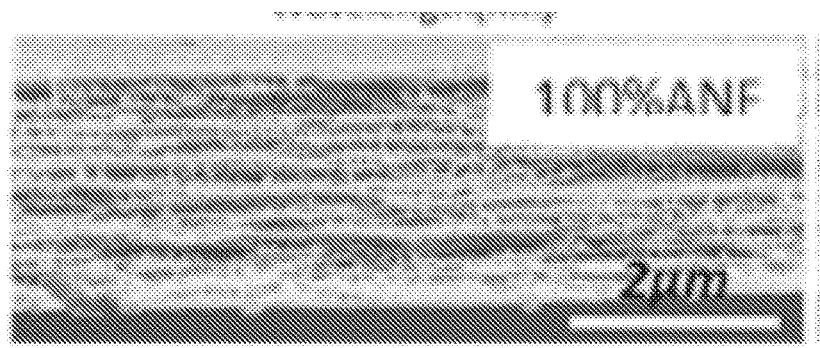
Figure 34:
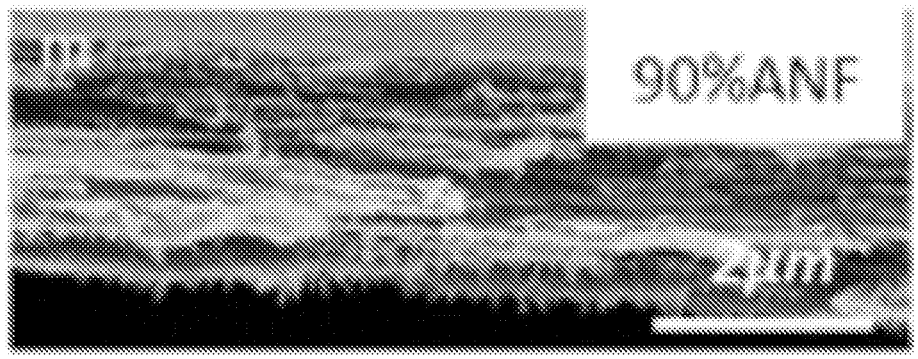
Figure 35:
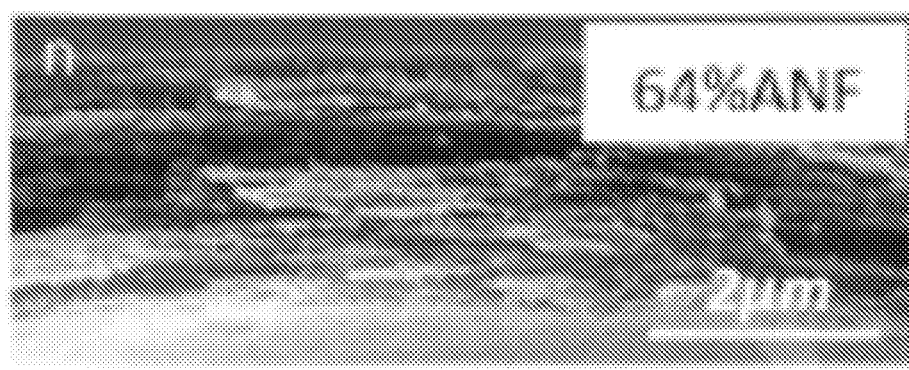

FIG. 32. A photograph of freestanding [1% ANF/1% EPX]$_6$.

FIG. 33-36. SEM image of the cross-section of ANF/EPX composite with 100%, 90%, 64%, and 38% ANF, respectively.

Figure 37:
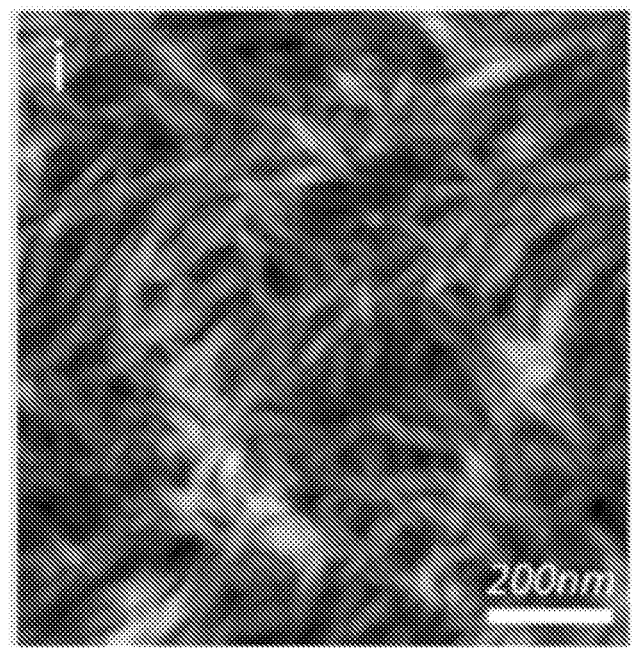

FIG. 37. AFM image of [1% ANF]

Figure 38:
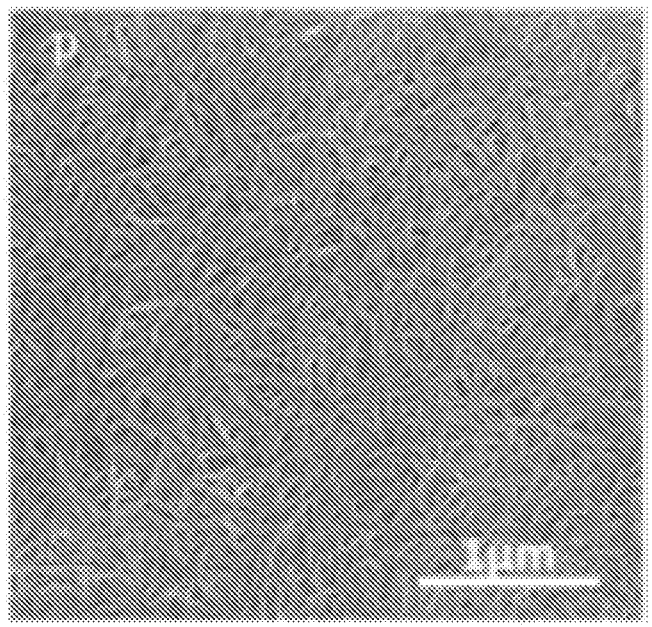
Figure 39:
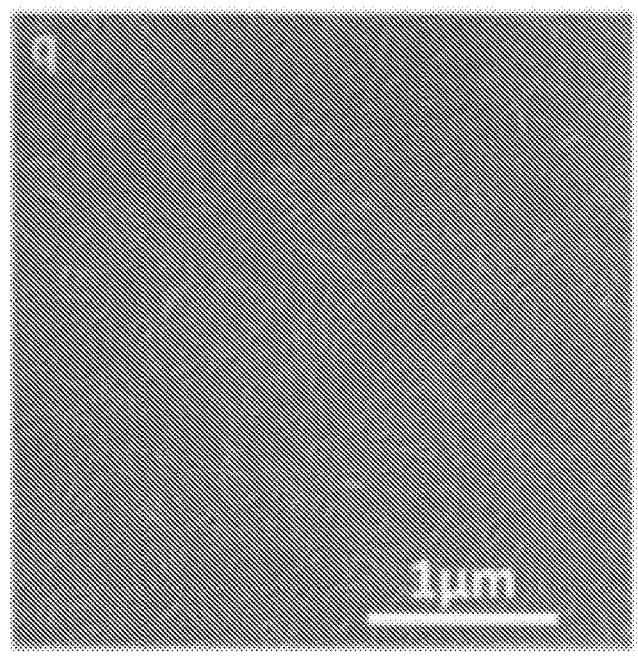

FIGS. 38 and 39. SEM image of the surface morphology of [1% ANF/1% EPX]$_1$ and [1% ANF/2% EPX]$_1$ respectively.

Figure 40:
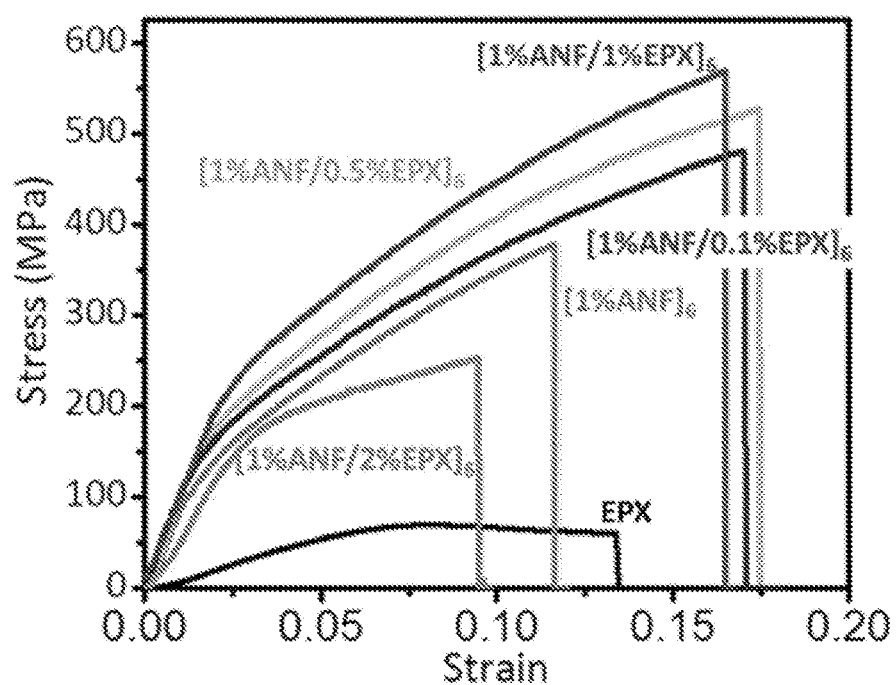

FIG. 40. Uniaxial tensile stress-strain curves for the ANF composites.

Figure 41:
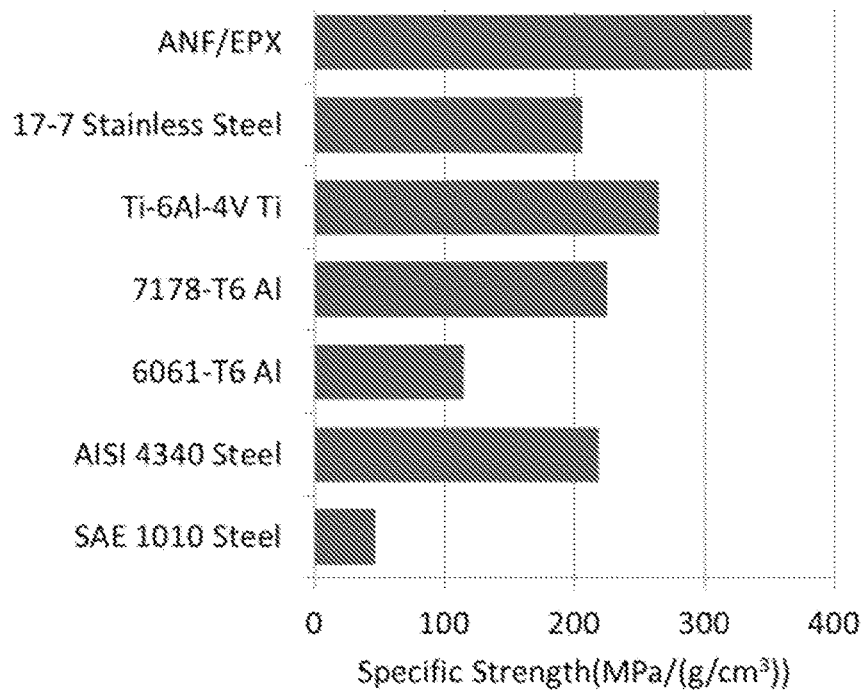

FIG. 41. Specific strength comparison of [1% ANF/1% EPX]$_6$ with various metal alloys.

Figure 42:
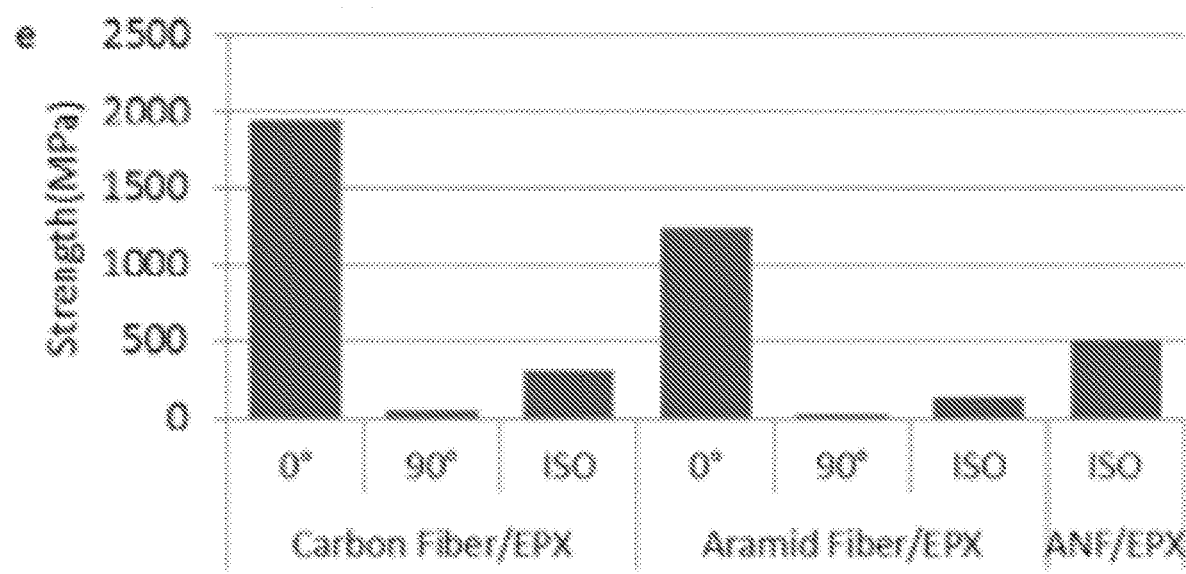

FIG. 42. Ultimate strength of [1% ANF/1% EPX]$_6$ in comparison with various carbon and aramid (Kevlar®) microfiber reinforced composites. ISO here stands for quasi-isotropic.

Figure 43:
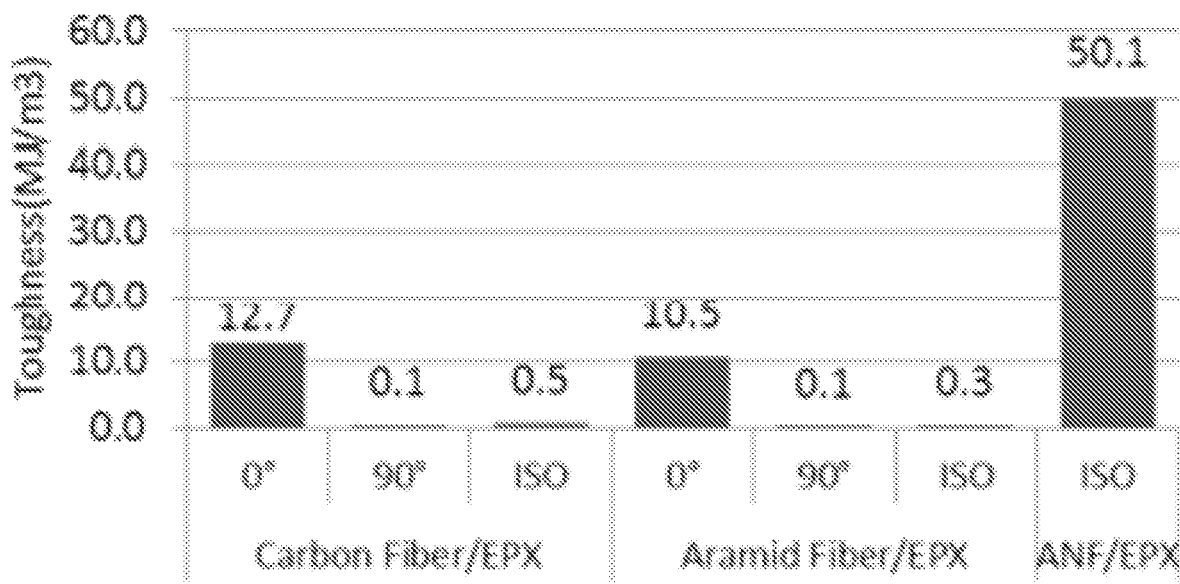

FIG. 43. Toughness of [1% ANF/1% EPX]$_6$ in comparison with various carbon and aramid (Kevlar®) microfiber reinforced composites. ISO here stands for quasi-isotropic.

Figure 44:
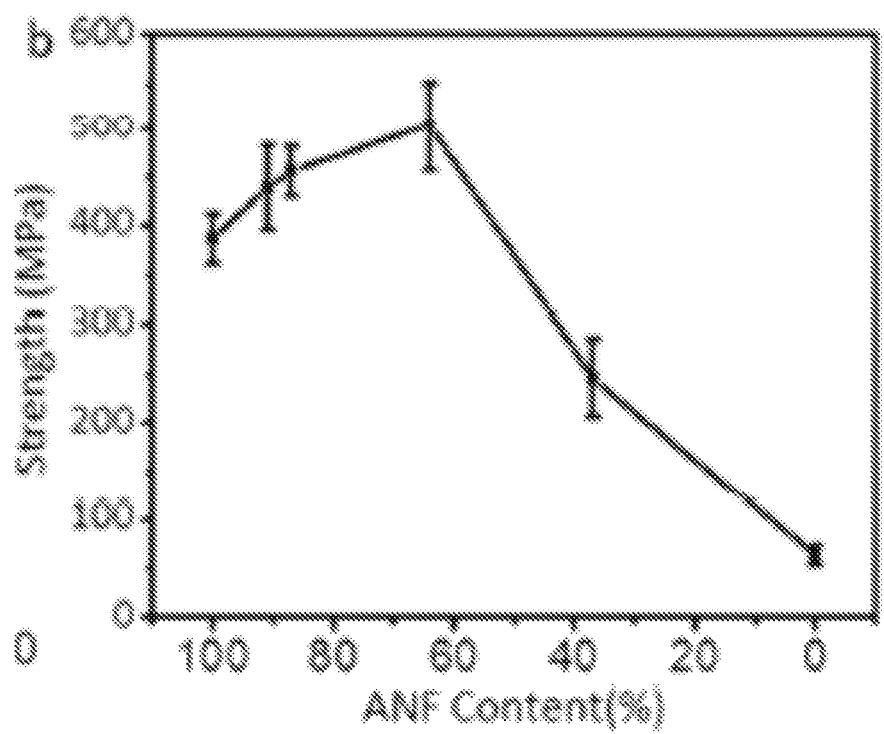

FIG. 44. Ultimate strength comparison for the ANF/EPX composites.

Figure 45:
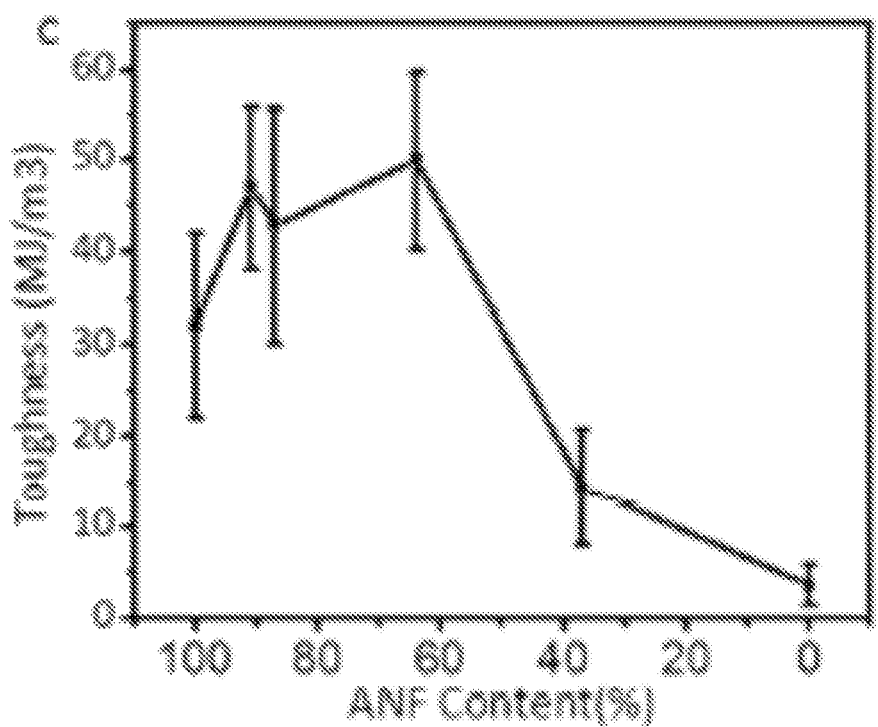

FIG. 45. Toughness comparison for the ANF/EPX composites.

Figure 46:
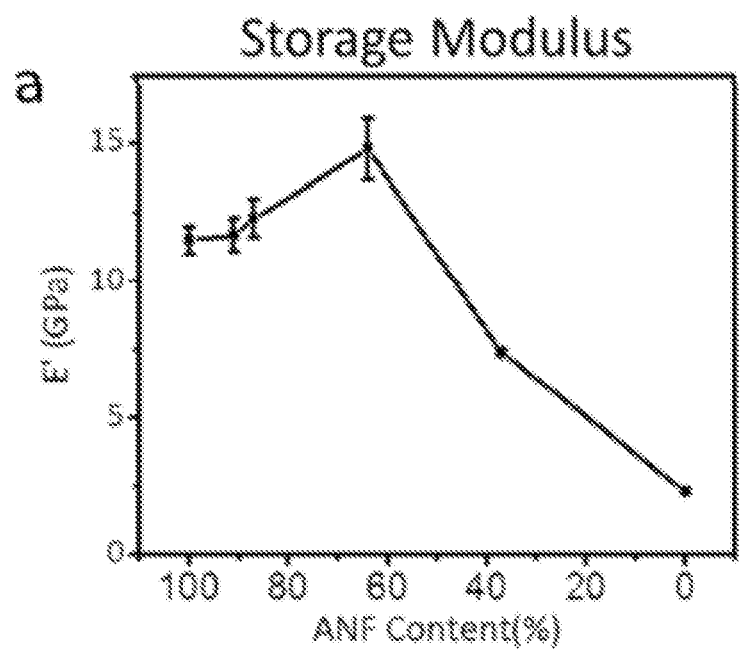

FIG. 46. Storage modulus comparison for the ANF/EPX composites.

Figure 47:
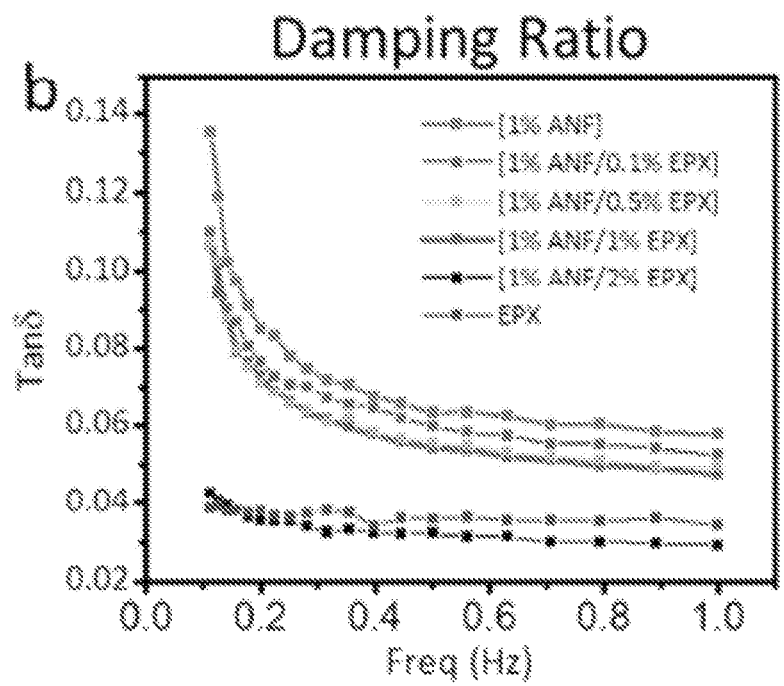

FIG. 47. Dynamic mechanical properties testing of ANF/EPX composites.

Figure 48:
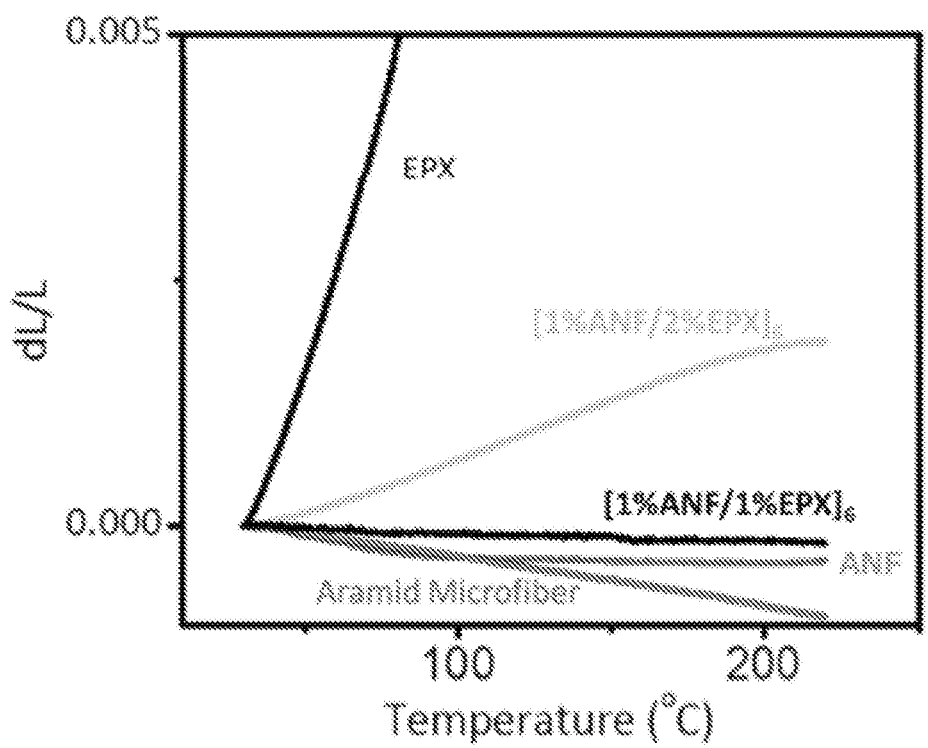
Figure 49:
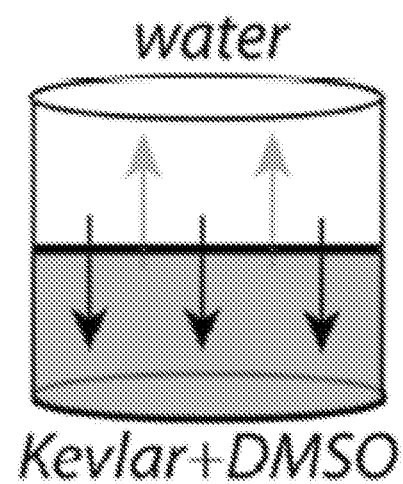

FIG. 48. Normalized length change $dL/L_0$ vs. temperature for several ANF/EPX composites, ANF film, EPX and aramid microfiber FIG. 49. Schematic drawing of the solvent exchange process for the formation of ANF hydrogel.

Figure 50:
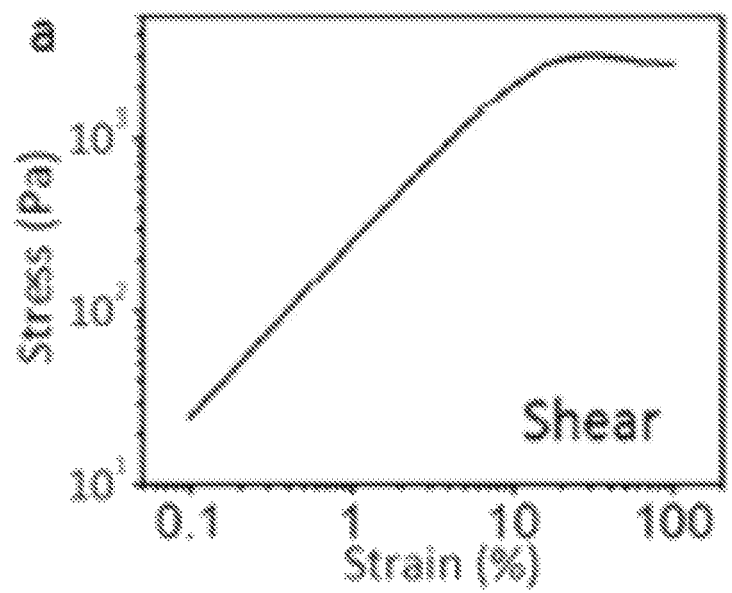

FIG. 50. Oscillatory shear strain-stress curve of ANF hydrogel.

Figure 51:
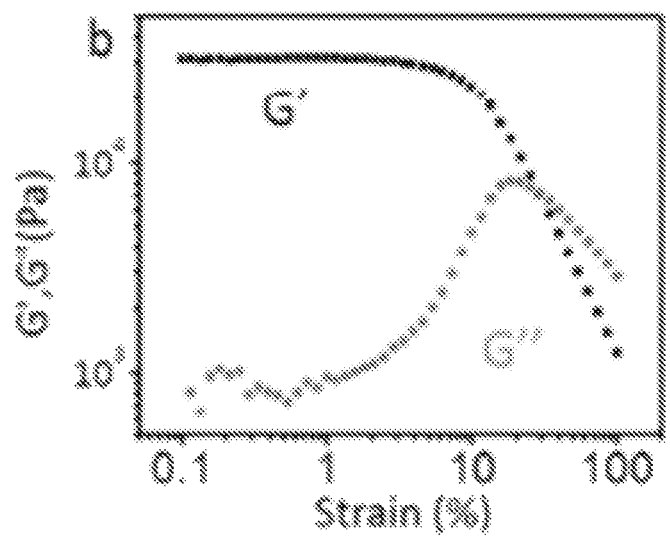

FIG. 51. Dependence of elastic moduli (G') and loss moduli (G") on the strain amplitude.

Figure 52:
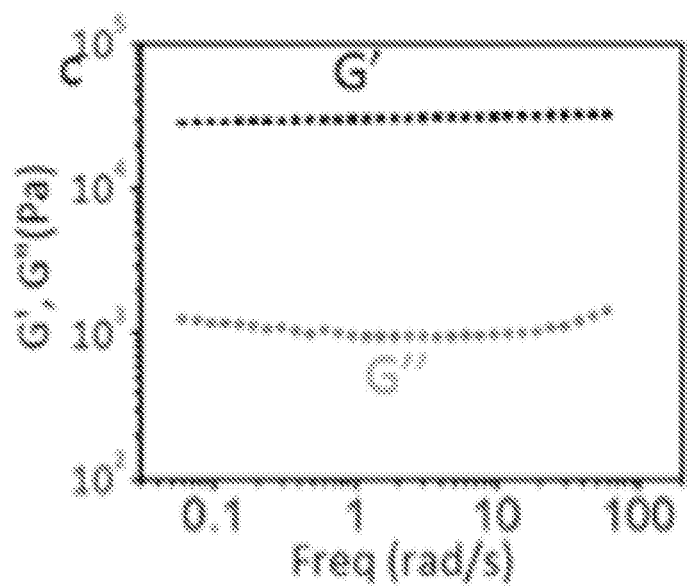

FIG. 52. Dependence of G' and G" on the frequency of the oscillatory shear.

Figure 53:
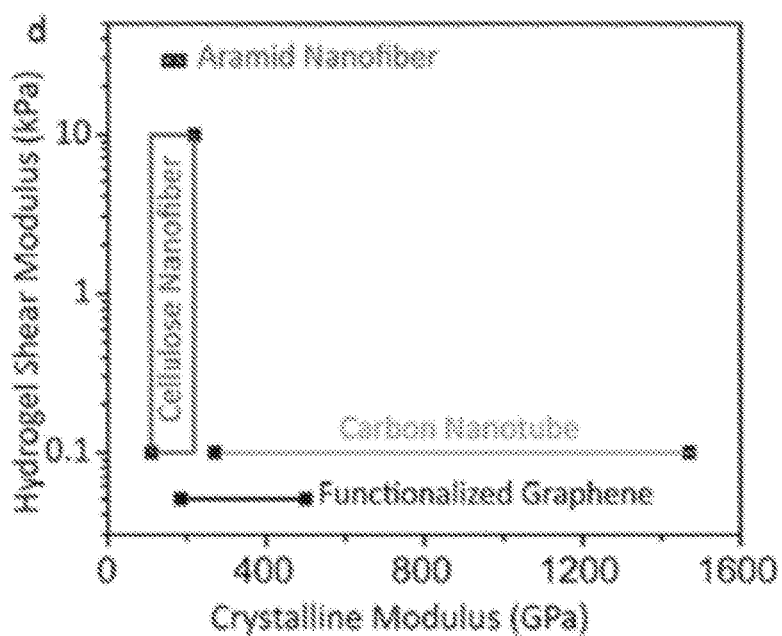

FIG. 53. Comparison between the ANF hydrogel and other hydrogels made of typical reinforcing nanomaterials with high crystalline elastic moduli.

Figure 54:
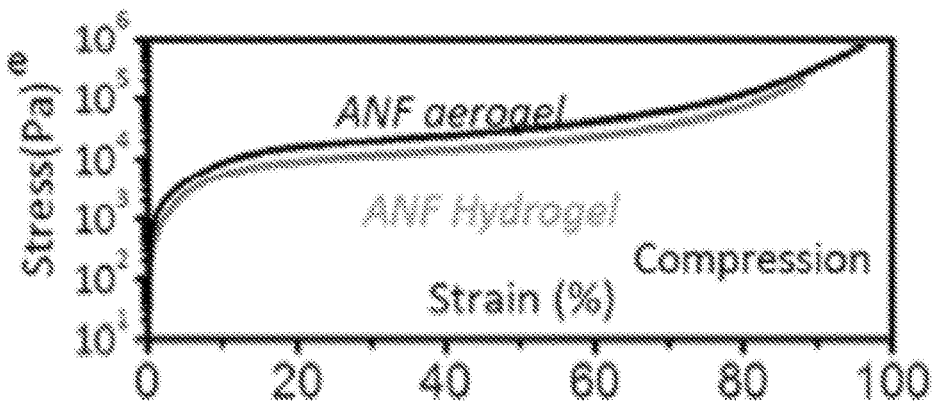

FIG. 54. Compressive stress-strain curves for ANF hydrogel and aerogel.

Figure 55:
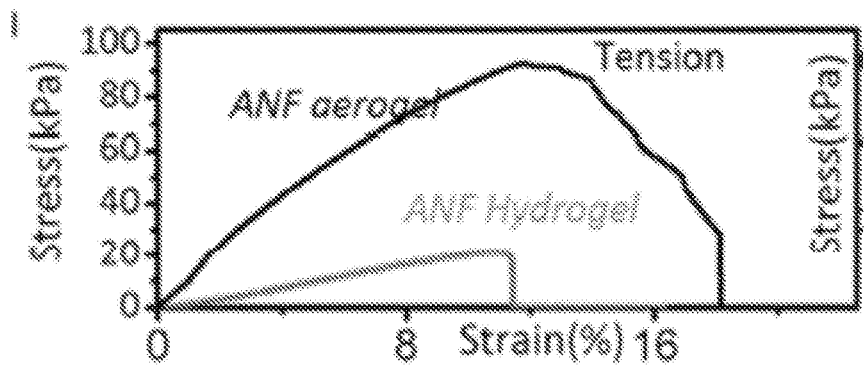

FIG. 55. Tensile stress-strain curves for ANF hydrogel and aerogel.

Figure 56:
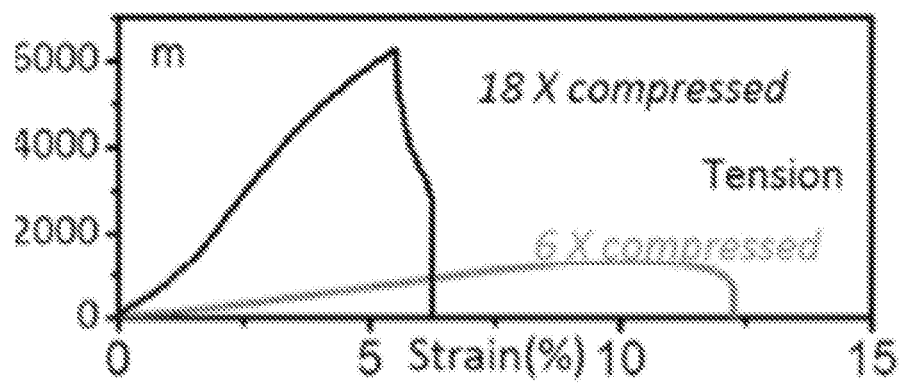

FIG. 56. Tensile stress-strain curves for ANF aerogel after being compressed into $\frac{1}{6}^{th}$ and $\frac{1}{18}^{th}$ of the initial height.

Figure 57:
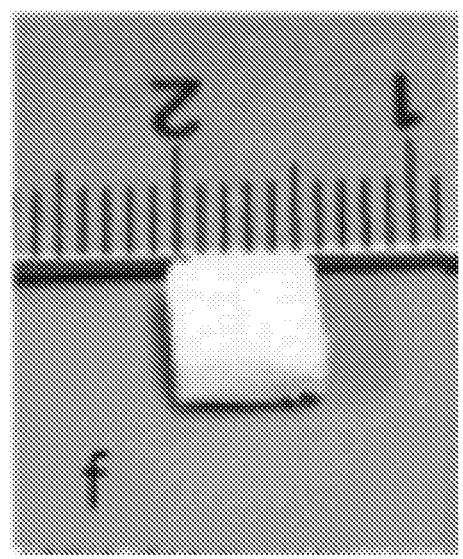

FIG. 57. Photograph of ANF aerogel before compression.

Figure 58:
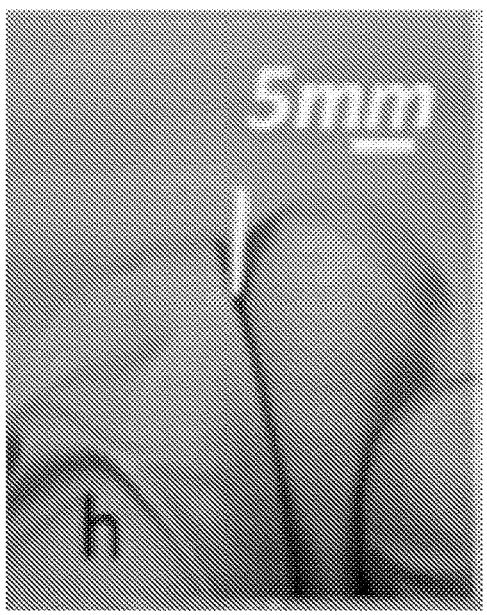

FIG. 58. Side view photograph of the compressed aerogel.

Figure 59:
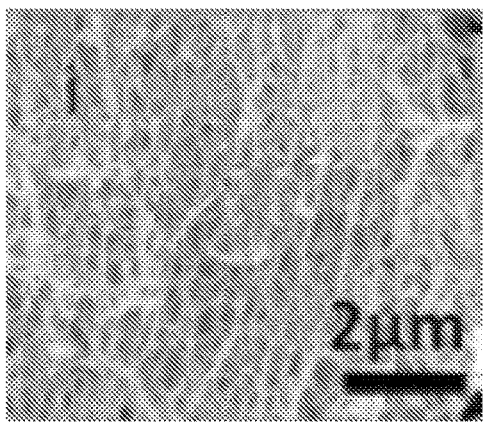
Figure 60:
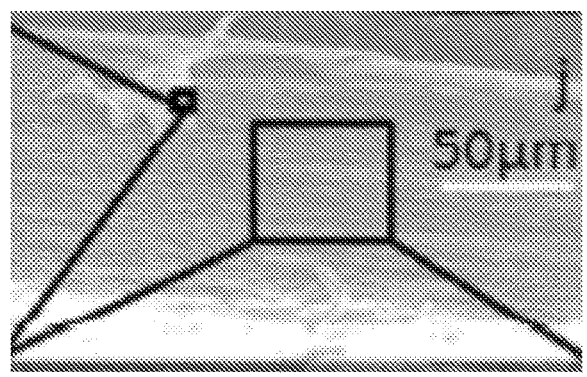
Figure 61:
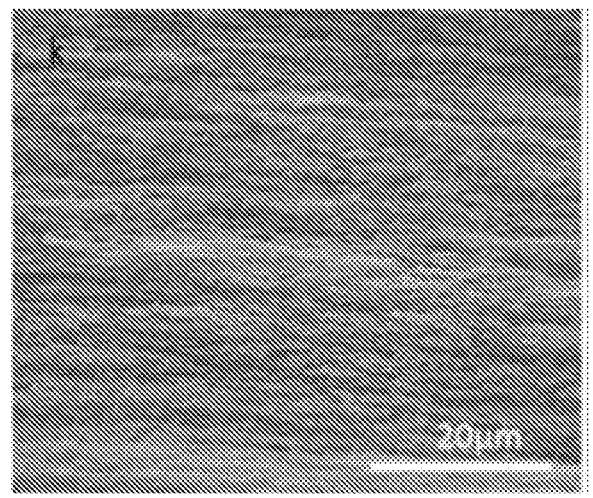

FIG. 59-61. SEM images of the edge of fractured compressed ANF aerogel at

Figure 62:
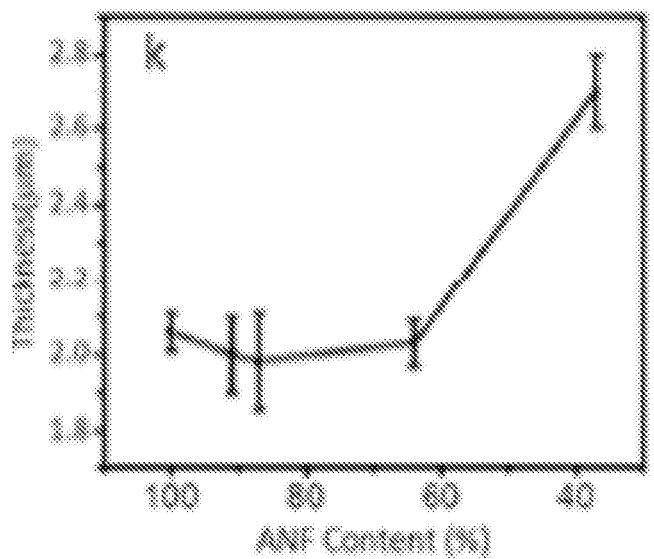

FIG. 62. Thickness of the film with different ANF fractions.

Figure 63:
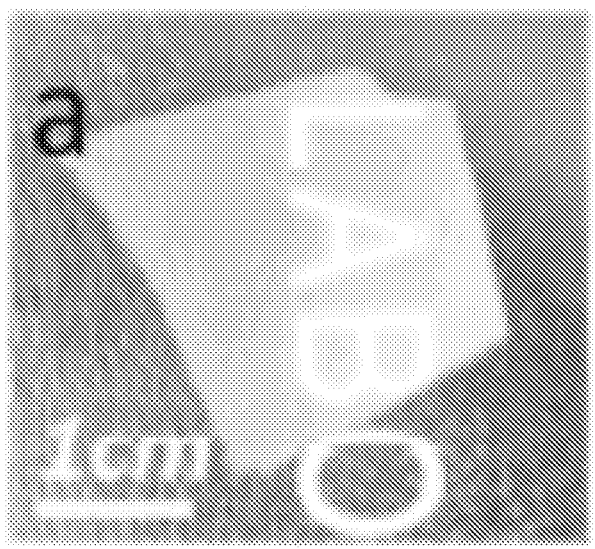

FIG. 63. Photograph of a piece of hydrogel sheet obtained in water.

Figure 64:
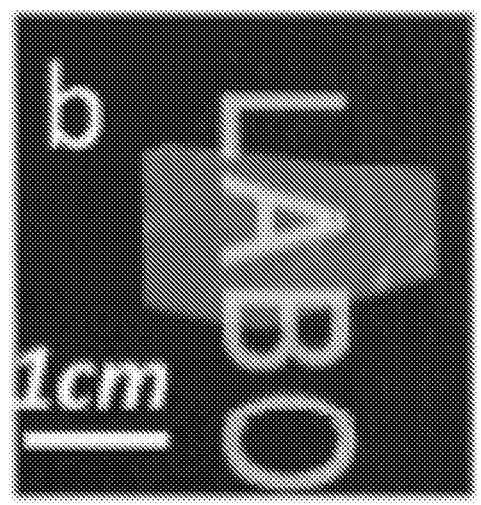

FIG. 64. Photograph of a PVA/ANF composite film.

Figure 65:
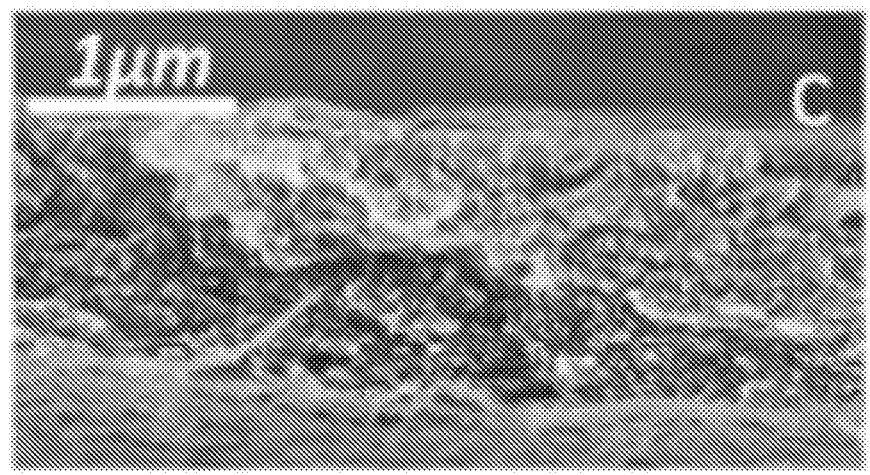

FIG. 65. Cross-section SEM image of a PVA/ANF composite film.

Figure 66:
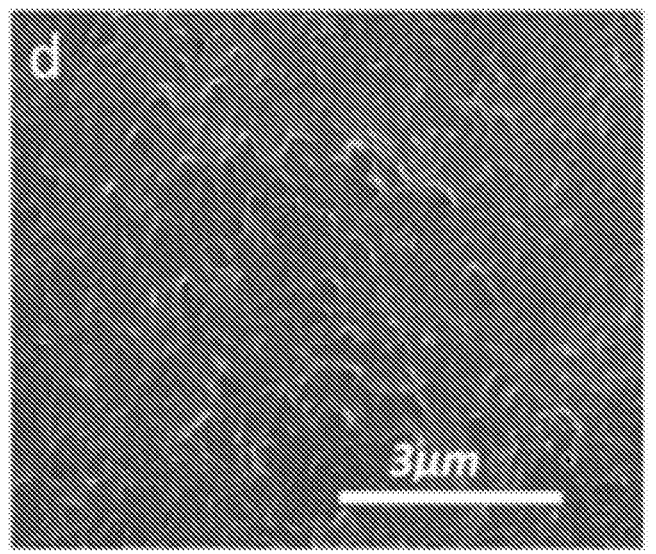

FIG. 66. SEM image of the surface morphology of a PVA/ANF composite film.

Figure 67:
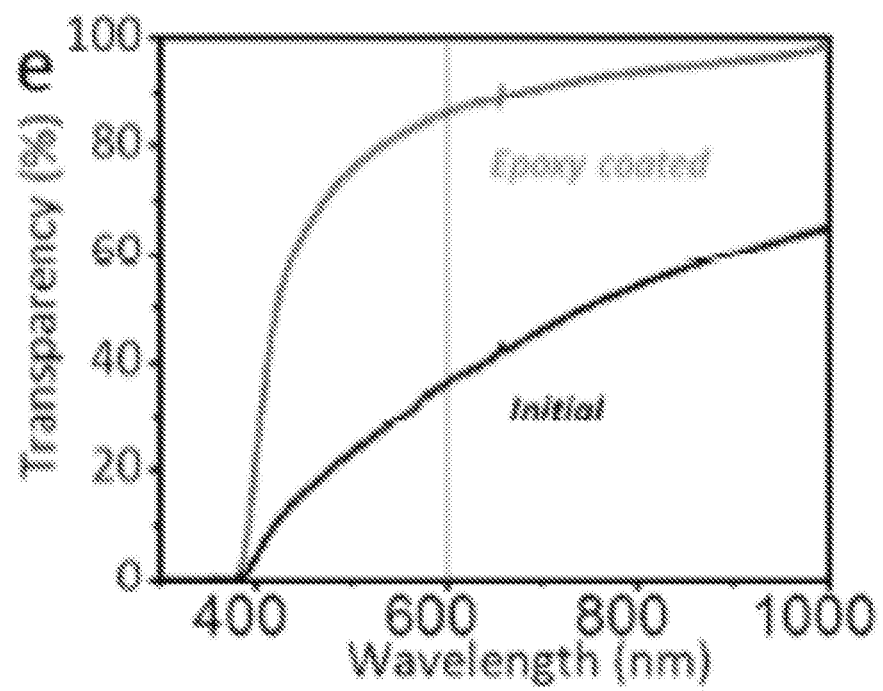

FIG. 67. Transparency of PVA/ANF composite film with and without epoxy coating.

DESCRIPTION

Aramid Material

The aramid material described herein is made of aramid polymers, generally in the form of fibers, threads, or yarns available commercially. Typically a commercially available aramid fiber is characterized by a diameter in the micro range, for instance by a diameter of one micron or greater. In one aspect, the current disclosure provides methods for transforming the commercially available microsized aramid fibers into branched ANFs.

Aramid polymers are defined as those that contain aromatic groups and amide linkages in the backbone. Normally, the amide groups provide linkages between adjacent aromatic groups. In one aspect, an aramid polymer is characterized as one in which at least 85% of the amide groups in the backbone are directly attached to two aromatic groups, especially where the aromatic groups are phenyl groups.

Two popular aramids are para-aramid fiber and meta-aramid fiber. The former is well known under the trademark of Kevlar® and others. Its backbone consists of phenyl groups separated by amide linkages, wherein the amides link the phenyl groups in a para-configuration. A para-aramid represented by Kevlar is also called a poly (para-phenylene terephthalamide) (PPTA). Although the synthesis is not limited to reacting the particular monomers, in a simple form, a PPTA can be understood as the reaction product of para-phenylene diamine and terephthaloyl dichloride. In similar fashion, a meta-aramid such as illustrated by Nomex material can be understood as the product as meta-phenylene diamine and isophthaloyl dichloride.

Besides meta-aramids like Nomex and para-aramids like Kevlar, other aramid fibers are available of the co-polyamide type. Co-polyamides have structures that result from polymerizing other aromatic diamines with terephthaloyl or isophthaloyl chlorides, alternatively in the presence of para-phenylene diamine. In whichever way the aramid fibers are produced, it is believed that the useful physical properties of the fibers derive from the stiff nature of the polymers, orientation along the fiber direction of the aromatic chains, and extensive hydrogen bonding along the chains.

Nanofibers

Branched ANFs are defined by their composition and by their dimensions. Branched ANFs are made of aramid material such as discussed above. By nanofibers is meant that the diameter is in the nanometer range, and especially in the range of 3 to 100 nanometers, 3 to 50 nanometers, 4 to 40 nanometers, 3 to 30 nanometers, and 3 to 20 nanometers. In addition to diameters in the nanometer range, the ANFs are characterized by a high aspect ratio, meaning that the length of the fibers is at least 5 times, at least 10 times, or at least 20 times the diameter. In various embodiments, the length of the ANFs is greater than 0.1 microns or greater than 1 micron. Non-limiting examples of the length of the ANFs includes 0.1 to 1 microns and 1 micron to 10 microns with 3-20 branches stemming from one nanofiber. Branching in the nanofibers can be observed using AFM, TEM, and SEM (FIGS. 1-3).

Making Suspensions of Branched ANFs

A process for making non-branched aramid fibers is given in US publication number US 2013-0288050, the disclosure of which is useful for background information and incorporated by reference. The process involves preparing a suspension of ANFs in a solvent, generally involving treatment of micron sized aramid fiber with a base. An aprotic solvent such as dimethylsulphoxide (DMSO) has been found to be suitable for the synthetic method. Branched nanofibers of the current teachings can be prepared by controlling the decomposition of the original micron-sized aramid fibers into nanofiber at the stage of a branched morphology. Shorter time of treatment with base (e.g. potassium hydroxide, KOH), its lower concentration, as well as addition of controlled amount of water into the treatment leads to the formation of branched ANFs. The change of the base from concentrated KOH to a weaker base will also result in the formation of the branched morphology.

In a non-limiting example a 1% branched ANF dispersion was prepared by stirring Kevlar 69 in DMSO-based reaction media at room temperature with addition of KOH in the amount of less or equal to 1 g/100 mL. Substitution of KOH with potassium ethoxide (EtOK) in the procedure also leads to branched ANF dispersion but the concentration is higher than that of KOH.

In various embodiments described herein, the process begins with commercially available aramid fibers having macro dimensions. Suitable aramid materials include those represented by the Kevlar® and Nomex® trade names and by aromatic co-polyamide materials.

In an optional first step, an aramid fiber is treated with ultrasound in a solvent to swell the fiber as a preliminary step in the manufacture of a nanofiber. It has been found suitable to sonicate the starting material aramid fiber in a solvent such as NMP to swell the fiber before further reaction. If the ultrasound treatment is carried out, the swollen fiber can be removed from the ultrasound solvent after the treatment and combined in another solvent in the presence of a base. Alternatively, the optional ultrasound step is carried out in the same solvent used for making the nanofibers. Whether or not it was subjected to ultrasound, the fiber is then reacted with the base and the solvent—preferably an aprotic solvent or a mixture of solvents including an aprotic solvent—at low to ambient temperatures for a time until nanofibers are formed. Advantageously, the temperature of reaction is at 50° or less, at 40° or less, or at 30° or less. In various embodiments, the temperature of reaction is 20 to 50° C., 20 to 40° C., or 20 to 30° C. Reaction can be carried out at or about 20° C. or at or about 25° C. Reaction at 25° C. is considered to be at room temperature.

The aramid material is reacted in the base solution at a temperature below 50° C. for times sufficient to produce branched ANFs having a diameter of 3 to 100 nanometers (FIG. 9), 3 to 50 nanometers, or the like. Reaction times are generally on the order of days or weeks, and are illustrated further in working examples described herein, while the reaction is conveniently carried under ambient conditions such as at room temperature. Generally, the reaction temperature is above 0° C. or above 10° C. or above 15° C. In various embodiments the temperature is below 45° C., below 40° C., below 35° C., or below 30° C. In an illustrative embodiment, the reaction is carried out at about 20-30° C. In this way the nanofibers are produced in situ and are suspended in the reaction solvent. It is found that under these conditions, the aramid material does not proceed to molecular dimensions where it could be considered as having been dissolved in the solvent. Rather, discrete nanofibers can be visualized in the suspension and in films produced from the suspension, which show the nanofibers having diameters less than 100 nm and high aspect ratios as described. The reaction in solution to prepare the suspension is carried out at low temperatures and can be carried out at room temperature or about 20 to 30°, for example, 25° C.

In a preferred embodiment, the solvent used to prepare the branched ANFs is made from DMSO as an aprotic component, water as a protic component, and KOH or EtOK as a base here denoted as reaction media. The reaction media can contain an amount of protic component, up to about 30 volume percent. Other protic components may include as non-limiting examples ethanol or isopropanol. Preferably, the base is provided in stoichiometric excess to the aramid material, and is conveniently applied in a one-to-one weight ratio. Relative to the amount of solvent, the combined weight of the base and the aramid material is from about 0.05 to 5%. In an exemplary embodiment, 500 mL of DMSO-based solvent is used, in which 1.5 grams of KOH is dissolved and in which 1.5 grams of aramid fiber material is suspended resulting in a ruby-red dispersion (FIG. 10)

The reaction conditions are sufficient to transform the starting aramid micro- and macrofibers into ANFs having dimensions as discussed above and further exemplified below. The reaction conditions do not lead completely to dissolution of the aramid material. As a result, the reaction product is a suspension of branched ANFs in a reaction media that preferably contains DMSO as the aprotic component.

In addition to DMSO or other aprotic component, the reaction media can contain small amounts of water, for example wherein the volume ratio of water to the solvent (i.e., an aprotic solvent such as DMSO) is from $1/20$ to about $1/1,000$. In various embodiments, it has been observed that the presence of controlled amounts of water leads to production of branched ANFs. In this way, the diameter of the nanofibers and the number of branches per nanofiber produced by the method can be controlled to a desirable extent.

As a first step, a conventional aramid fiber of micro or macro dimensions is subjected to an optional first step involving exposing the aramid material to ultrasound energy while the aramid material of macro dimensions is in contact with a solvent. N-methylpyrrolidone (NMP) has been found to be a suitable solvent instead of DMSO. The aramid material undergoing exposure to the ultrasound energy is made of fibers having a diameter of greater than 1 micrometers, in non-limiting example.

After the optional pre-treatment of the aramid fiber of micro or macro dimensions with ultrasound, the aramid material is combined with a solution containing a base and an aprotic solvent. The aprotic solvent can be the same as or different from the solvent in which the ultrasound treatment was carried out.

In various embodiments, the KOH/EtOK/DMSO-based reaction media can contain water in a volume ratio of water to DMSO of 1 to 20 to 1 to 1,000. In a non-limiting embodiment, the reacting solution contains equal parts by weight aramid material and KOH. Further, the aramid material and the base are present in relatively minor amounts in the solution, making up for example about 0.05% to about 5% by weight of the solution. In one embodiment, the weight of the KOH and the aramid material is about 7.6% by weight of the suspension.

The suspensions of branched ANF optionally contain other nanomaterials. Non-limiting examples of other nanomaterials include nanoparticles of metals to provide conductivity, ceramics to provide porosity and improved mechanical properties, magnetic nanoparticles to provide magnetic properties, carbon nanofibers to provide conductance, and cellulose nanofibers (or cellulose nanowhiskers) to provide improved mechanical properties and biocompatibility. These can be added to the ANF dispersion, or they can be incorporated at other stages in the process. For example, cellulose nanofibers can be pre-dispersed into a solvent, for example by sonication. The nanoscale dispersion is then mixed into the ANF dispersions described herein. In a non-limiting example, a cellulose nanofiber mixture (dispersion) in DMSO is mixed into a 2% ANF dispersion to create a 1.5% ANF solution.

Transformation of the Suspension of Branched Nanofibers into 3DPN

To make a hydrogel from the suspension in reaction media, the suspension is phase transformed into 3DPN by replacing the aprotic solvent with water or with a mixture of water and another solvent. A yellow precipitate forms as the water replaces the aprotic-based reaction media of the suspension. One way of phase transforming is to place the suspension in a cylindrical tube and to layer it with water by slowly dropping water on top of the suspension, while minimizing disturbance. The phase transformation begins at the water-solvent interface, and spreads as convection mixes the two solvents.

Another process called phase transforming involves adding water as a layer on top of a layer of branched ANF suspension that is coated on a substrate. The water in the added layer diffuses relatively quickly into the nanofiber suspension to cause what is being called a phase transformation. The product of phase transforming is a hydrogel containing water and branched ANFs. The hydrogel is made from highly interpenetrated network of aramid nanofibers interweaved with each other. The branched morphology of ANFs and their mechanical strength and stiffness allows them to withstand the surface pressure and solvent exchange producing 3DPN.

Removing Water from the Hydrogel to Make an Aerogel

Once the hydrogel is formed by any of the methods recited herein, an aerogel is prepared by removing the solvent in such a way as to maintain the 3DPN from the nanofibers. Examples include freeze drying and also extraction with a supercritical fluid such as supercritical carbon dioxide. Other methods to make aerogels include bubbling gas through the dispersion of ANFs, adding liquid that becomes gas at elevated temperature, and adding solid chemicals such as metal carbonates that produce gas upon chemical reactions.

The result of solvent removal from the aerogel results in a porous light weight material with distinct physical integrity and rigidity indicative of the robustness of its structure (FIG. 11-13). Scanning electron microscopy examination of the aerogel revealed distinct 3DPN structure (FIG. 14). The ANF hydrogels and aerogels can be combined with polymer materials to make composites suitable for a number of applications. Alternatively, the aerogel can be ground into meso-, micro, and macroscale particles, plates, cylinders, etc, or other particulate matter that retains 3DPN structure and provide filler material for other polymer composites.

Making Composites from 3DPNs from Branched ANF and Polymers

Nanofibers described herein are compounded with polymeric materials to form various composites. In one aspect, the porous ANF aerogel, with a polymeric material is filled with other material disposed in the pores of the aerogel to form a solid composite. Alternatively, the composites are described as having a polymer matrix in which branched ANFs and optionally other materials are dispersed. They are dispersed in the polymer in the sense that the branched ANF and optional other materials are homogeneously blended in the polymeric matrix, which forms a continuous main phase. In various embodiments, enhanced physical properties result from the nature of the interaction of the nanofibers with the polymeric matrix. The ability of 3DPNs from ANFs to withstand the treatment with other solvents and compatibility with both protic and aprotic solvents, hydrophilic and hydrophobic solvents, acidic and basic solvents makes possible successful incorporation of other materials into 3DPNs made on the basis of branched ANFs.

The polymers are chosen from thermosets and thermoplastics. Thermosets include epoxies, polyurethanes, polyester resins, natural and synthetic rubbers, elastomers, fluorocarbon elastomers, phenol-formaldehyde resins, urea-formaldehyde resins, melamine-formaldehyde resins, diallylphthalate resins, polyimides, polycyanurates, and polyureas. Thermoplastics include acrylics such as poly (methyl methacrylate), acrylonitrile butadiene styrene (commonly known as ABS), polyamides such as Nylon 6 and Nylon 66, biodegradable polymers such as poly (lactic acid) (PLA), polybenzimidazole, polycarbonate, polyvinyl alcohol, polyvinyl acetate of various degrees of saponification, polyether sulfone, polyether ketone, polyetherimide, and aromatic polyamides such as the Kevlar® and similar polymers.

In various embodiments, the composites are made by simply stirring, mixing, or otherwise agitating a combination of branched ANFs and polymer until a dispersion is achieved. Since the method necessarily involves heating the mixture of nanofiber and polymer to the latter's melting point, it is less preferred in some systems.

In one embodiment, a hydrogel, in the form of a bulk solid, a fiber, or a thin sheet is made of water and ANFs, wherein the nanofibers made by ejection from a nozzle of specified diameter as demonstrated in the FIG. 16. A syringe set up is used to extrude ANF suspension and join it with a water line to form the hydrogel at the same time the combined stream exits from the syringe as shown in FIG. 17. The extruded fibrous hydrogels are collected in a beaker as shown in FIG. 18. The extrusion from a coaxial needle results in a hollow fiber. The internal structure of the fiber reveals distinct 3DPN under scanning electron microscopy examination as demonstrated in FIGS. 19 and 20.

Another method of making 3DPNs involves the step of removing the water from the hydrogel to make an aerogel made of ANFs. One way to remove the water involves extracting with supercritical carbon dioxide.

The method of fiber extrusion can be carried continuously or in batch. Extrusion of the original dispersions of ANFs into water or other protic solvents results in the continuous production of hydrogel fibers. In a continuous method, a suspension of branched ANFs is extruded through a syringe or extrusion die into a flowing water line so that the suspension is continuously contacted with the water. The suspension is phase transformed in real time as the suspension contacts the water. The extruded hydrogel can take the form of a fiber when extruded through a syringe, of a hollow tube when extruded through a coaxial die or needle, or can take the shape of an extrusion die, for example as a flat sheet of varying dimensions In another embodiment, a method comprises the steps of providing a suspension of branched ANFs in an aprotic solvent and then phase transforming the suspension by diffusing water into the suspension following by the fiber drawing from the water-solvent mixture. In non-limiting fashion the aprotic solvent comprises DMSO and the extruded dispersion of branched ANFs is comprises DMSO, water and 0.1-5 weight % of ANFs.

In another embodiment the fiber extrusion and drawing can be performed from the dispersion of a nanoscale or polymeric material compatible with the dispersion of branched ANFs.

Alternatively, the branched ANF suspension is extruded from a extrusion die into a phase transformation bath (one containing enough protic solvent to accomplish phase transformation of the suspension) to form films. The extruded films are then dragged by a conveyor belt through the bath and into a subsequent drying stage, such as one that applies heated plates on top and bottom of the film.

In another embodiment, a composite material comprises a polymer matrix and ANFs dispersed in the polymer matrix. For example, the composite material is made of an aerogel and a polymer in the pores of the aerogel, wherein the aerogel comprises ANFs. The polymer comprises a cured EPX, in a non-limiting embodiment.

Other nanomaterials can be added to the ANF dispersions and reaction media for their synthesis. Examples include nanoparticles of metals to provide conductivity, ceramics to provide porosity and mechanical properties, magnetic to provide magnetic properties, carbon nanofibers to provide conductance, and cellulose nanofibers to provide mechanical properties and biocompatibility.

Layer by Layer Deposition Assisted by Gelation of ANFs (gaLBL)

In a particular embodiment, the composite materials are made using a gelation assisted layer-by-layer deposition process (gaLBL). Instead of stirring or agitating to form a homogenous blend at or above the melting temperature of a polymer, an LBL-made composite is built up by alternately depositing a layer of branched ANF suspension capable of gelation and a layer of a solution of polymer precursors or a layer of a solution of polymer capable of penetration into 3DPN made by branched ANFs. The layer of branched ANF deposited is between 100 and 5000 nanometers, the polymer diffusion process occurs quicker than in the previous embodiments of infiltration of 3DPNs.(1, 2)

Optionally, the layer of suspension from branched ANFs is subjected to a phase transformation before the polymer or polymer components are applied. After the first two layers of nanofiber and polymer are laid down, the bilayer forms a new substrate upon which subsequent bilayers of fiber and polymer can be laid, until a desired thickness of nanocomposite is achieved.

In one embodiment, the dispersion of branched ANFs is phase transformed to a hydrogel before the polymeric components are added. After phase transformation with water or other protic solvent, the water-containing hydrogel is infiltrated with a solution of polymer components or a solution of polymer. The solvent containing the polymer or polymer components is any that readily dissolves the contents, and is preferably miscible with or readily soluble in the water or other solvent that is found in the hydrogel, with acetone being a non-limiting example.

In various embodiments, the method involves the steps of:
a. providing a coating of a dispersion on a substrate, wherein the dispersion comprises ANFs in a reaction media specified above;
b. phase transforming the coating of a. with a protic solvent to form a 3DPN;
c. infiltration of 3DPN with a pre-made polymer;
d. penetrating precursors of a polymer dissolved in solvent or a solution of a formed polymer into the 3DPN of step c.
e. polymerizing the polymer precursors in situ in the case where precursors of the polymer are used in step d.; and f. removing the solvent from the product of step e., for example by extraction with a supercritical fluid such as carbon dioxide, whereupon the 3DPN of ANF collapses and blends uniformly with the polymer.

If desired, steps a-c can be repeated one or more times to build up a desired thickness of composite before delaminating the composite, with the understanding that the uniform blend of polymer and ANF after step c. becomes the substrate for the subsequent step a. of providing a coating of a dispersion on a substrate.

Also if desired, the sequence of steps a, b, d, e, and f can be repeated one or more times to build up a desired thickness of composite with in-situ polymerization step before delaminating the composite, with the understanding that the uniform blend of polymer and ANF after step f. becomes the substrate for the subsequent step a. of providing a coating of a dispersion on a substrate. In one embodiment, the polymer precursors include an epoxy resin and an epoxy hardener.

In a particular embodiment of gaLBL with assistance of spin coating, the method involves the steps of
   a. spin coating an ANF dispersion in a reaction media specified above on a substrate;
   b. exchanging DMSO in the dispersion with water to make a spun ANF thin film;
   c. removing excess water by spinning;
   d. spin coating an epoxy solution on top of the spun ANF thin film; and
   e. optionally repeating the above steps to build up a desired thickness.

In another embodiment, a gaLBL process with spin coating involves one or more cycles of 3DPN formation from branched ANFs, wherein a cycle comprises the steps of phase transforming a spin coated branched ANF dispersion with water, and then infusing polymer by penetrating a solution comprising a solvent and either a polymer or polymer precursors into the 3DPN of the phase transformed branched ANF dispersion, then drying off the solvent to densify the ANF network. Similarly, two or more layers of epoxy are spin coated after each ANF dispersion is spin coated.

When polymer components are added by way of solution, the components can be subject to a subsequent polymerization step. In this way, composites of thermoset polymers can be prepared. Examples of such thermoset polymers include without limitation epoxies, polyurethanes, polyester resins, natural and synthetic rubbers, elastomers, fluorocarbon elastomers, phenol-formaldehyde resins, urea-formaldehyde resins, melamine-formaldehyde resins, diallylphthalate resins, polyimides, polycyanurates, polyisocyanurates, polyureas, and so on. The polymeric components include not only the monomers that react with one another to form the polymer, but also any necessary or desirable auxiliaries such as catalysts, curing accelerators, fillers, colorants, and so on.

Composites with thermoplastic polymers are made by infiltrating a solution of the polymer into the branched ANF dispersion or into the phase transformed hydrogel made from the dispersion. Such can be accomplish by coating the solution onto the coating of branched ANF dispersion previously laid down, for example by spin coating. In some embodiments, polar polymers are preferred because they contain active hydrogens that can form hydrogen bonds to the aramid molecules, leading to better compatibility of the dispersed fibers and the polymer. Examples of polar polymers include acrylics such as poly (methyl methacrylate), acrylonitrile butadiene styrene (commonly known as ABS), polyamides such as Nylon 6 and Nylon 66, biodegradable polymers such as poly (lactic acid) (PLA), polybenzimidazole, polycarbonate, polyvinyl alcohol, polyvinyl acetate of various degrees of saponification, polyether sulfone, polyether ketone, polyetherimide, and aromatic polyamides such as the Kevlar® polymers from which the aromatic nanofibers are made. Non-polar polymers include polyolefins such as polyethylene, polypropylene, polystyrene, polyvinyl chloride, and various fluoropolymers such as polytetrafluoroethylene (PTFE). Infiltration solutions of thermoplastic polymers to be used in gaLBL can include various auxiliaries such as colorants, antioxidants, lubricants, and the like.

Epoxy Nanocomposites

In various embodiments, EPX is selected to infiltrate into the ANF gels for its generality of these thermosetting polymer materials displaying wide variety of mechanical properties and functionalities strength. EPXs are often used with microscale fibers, but their combination with nanoscale components has until now been relatively difficult to make and relatively disappointing in performance, in part because of high viscosity of EPXs and difficulties with efficient dispersion of nanomaterials in them.(5, 6) The current teachings demonstrate that quasi-isotropic layered ANF/EPX composite can be made by gaLBL. Moreover, it shows toughness exceeding 4 to 5 times that of conventional micro-composites. The ANF and EPX combination also displays close-to-zero thermal expansion and high transparency in the visible spectrum, which are the specific attributes imparted to the composite by ANFs. A cartoon illustrating the process is given in FIG. 21.

The substrate used in the methods described herein provides a platform on which the composite materials can be built up. In some embodiments, the built-up composite is removed from the substrate before use. In other embodiments, the substrate becomes part of the device being made, such as is the case when ANF based insulation coatings are provided for implantable electronics. In various embodiments, the substrate can be selected from glass, metal, plastic, and so on. For electronics use, the substrate can be silica, optionally silica provided with a triple metal layer such as Cr/Au/Cr (20 nm/400 nm/20 nm).

Ion Conducting Membranes, Cathodes, Anodes, and Separators for Batteries

The use of non-branched ANF to make ion conducting membranes is disclosed in U.S. provisional Ser. No. 61/941,785 filed on Feb. 19, 2014, and in international application PCT/US2015/016675 filed Feb. 19, 2015. The entire contents of the two applications is hereby incorporated by reference.

In the incorporated applications, an ion conducting membrane (ICM) is built from ANF and used in a wide variety of batteries as a separator between two electrodes, being an anode and a cathode, or being a positive electrode and a negative electrode. An advance over the art involves direct coating of a branched ANF dispersion onto one of the electrodes or onto an existing separator. The coating basically provides an ANF based separator or ICM. Fabrication of an electrode assembly is simplified because the coated electrode can be directly assembled adjacent the other electrode so that only two parts are needed for assembly instead of all three (i.e., two electrodes and the separator).

The direct coating method is to apply an ICM solution/mixture/slurry containing ANF onto an existing electrode. In addition to ANF, the solution/mixture/slurry compositions optionally include organic fibers (such as cellulose microfibers, cellulose nanofibers, and poly(p-phenylene-2,6-benzobisoxazole) (PBO) nanofibers), inorganic nanomaterials (such as ceramic nanoparticles, nanowires, and the like), as well as other components disclosed in the incorporated documents. These include components electrolytes, polyelectrolytes, polymer nanoparticles, and other functional material for batteries.

This method provides a thermally stable, electrically insulating, ion conducting and mechanically stiff ICM to provide dendrite suppression, thermal runaway prevention, and other benefits. The close contact between the electrode and ICM will also provide benefits in lowered interfacial resistance, easier handling of thin separators (100 nm-10 µm) and simplified assembly of batteries. This direct coating can act as a thermal stability enhancing layer for electrodes, where the layer is to reduce the current generated during a hard shorting situation (e.g., nail penetration), reducing the heat generated and thus preventing thermal runaway.

A coated electrode made with these methods can be combined with another electrode to form an electrode assembly either with or without a free-standing separator. In the case of an electrode assembly with a free-standing separator, the branched ANF coating on the electrode will act solely as a thermal stability enhancing layer to prevent thermal runaway. In the case of an electrode assembly without a free-standing separator, the branched ANF coating on the electrode will act as an ICM and will assume the role both of a separator and of a thermal stability enhancing layer.

The electrodes can be any commercially available electrodes. Some are made of carbon with polymeric binders. Others include electrodes of lithium metal or any lithium active material like lithium titanate. Silicon containing anodes can also be used. The electrodes and the assemblies made from them find use in fuel cells and in batteries such as lithium batteries.

Since the branched ANF coating is applied directly to the electrode, the separator/electrode is a one piece design, giving close contact between the separator and electrode. In a traditional battery assembly, where there is cathode, separator, and anode, there are three components to assemble and align together. With a coated electrode, it is only necessary to assemble two components since the separator is already coated on one of the electrodes.

A non-limiting way of fabricating an branched ANF coated electrode involves the following illustrative steps:
  a. Mix branched ANF-based solution/mixture/slurry with desired components ($Al_2O_3$ nanoparticles, cellulose fibers, polyelectrolytes etc.) The branched ANF composition may range from 100% to 10% of the solids in the solution, mixture, or slurry.
  b. Fix electrode onto a glass substrate.
  c. Pour ANF ICM solution/mixture/slurry onto the electrode and coat evenly using a doctor blade.
  d. Wash the assembly in protic solvent such as water, ethanol, isopropyl alcohol etc.
  e. After complete solvent exchange, dry the ANF ICM/Electrode assembly under compression in a vacuum oven at 60° C.

Figure 22:
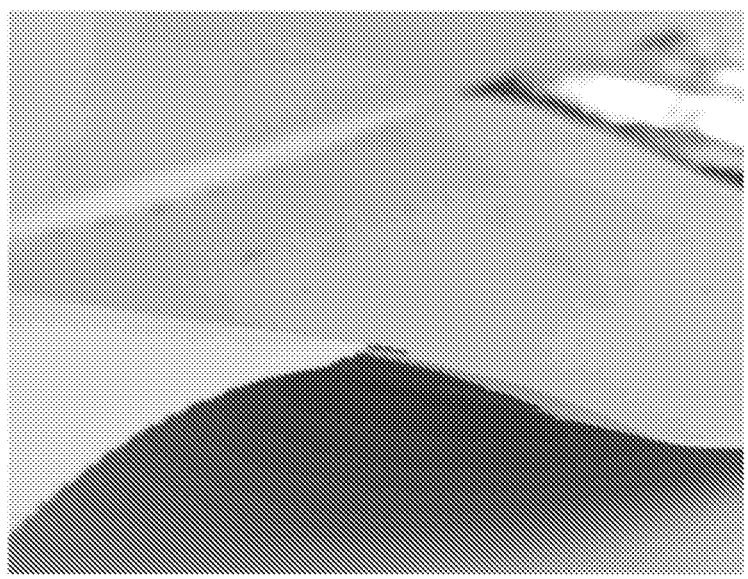

The completed assembly should have an ANF ICM adhered evenly to the electrode. The ICM from branched ANFs may detach from the electrode when electrolytes are added to the battery cell during assembly, however, in the dry state, the ANF ICM should be adhered to the electrodes as shown in FIG. 22.

The process of coating an electrode involves using the electrode material as a substrate in the coating methods described herein and in the incorporated documents. A slurry from branched ANF is deposited on the electrode substrate and then is phase transformed to make a gel, which is a hydrogel when water is used for the phase transformation. After optional solvent exchange the ANF coating is dried to form a dried gel as a coating on the electrode. Compression vacuum is use during drying to prevent wrinkles and enable the coating to come out flat and even.

This process can be scaled-up with several continuous coating methods, such as dip coating, slot die coating, micro gravure coating, and spray coating. The choice of coating methods will depend on the required output and coating thickness.

Working Example

1. Prepare a 2 wt % branched ANF suspension in a suitable solvent or reaction media described above.
2. Add alumina nanoparticles (Sigma Aldrich, 50 nm) 1.4 g into 31 g of the 2% branched ANF suspension by rigorous planetary mixing at ~1500 rpm for 15 minutes.
3. Carbon anode is fixed onto a glass substrate and flattened.
4. The alumina/ANF mixture is poured over the anode and spread evenly using a doctor blade. The coating thickness ranges from 300 µm to 10 µm.
5. The coated anode is submerged into an ethanol bath for 30 minutes to allow gelation and solvent exchange.
6. The coated anode is removed from the ethanol bath and sandwiched between two glass slides and dried in a vacuum oven overnight at 60° C.
7. After the coated anodes are dried, circular electrodes are punched out and further dried for 2 hours at 110° C. under vacuum.
8. The coated electrodes are then assembled into coin cells with a nickel-manganese-cobalt (NMC) cathode with no separator needed.

In a first embodiment, the current teachings provide a method of preparing branched ANFs suspended in a suitable solvent with controlled addition of protic components, base and protic solvent leading to partial splitting of the micro- and microscale fibers of polymers into nanofibers with branched morphology; wherein the nanofibers are characterized by high yield exceeding 95% of the nanofibers; a diameter of the nanofibers not exceeding 100 nm; a high monodispersity of the nanofiber with diameters distribution controlled by the reaction media and 90% of the nanofibers distributed within 20 nm of the mean diameter; the branching of the nanofibers is controlled by the reaction media such as amount of aprotic component and/or the chemical nature of the base; and the number of branches for each nanofiber can be varied between 2 and 50. The method further involves transforming the suspension of the branched ANFs by diffusing water, other protic solvent, or their mixture into the suspension to make a hydrogel that represents a 3DPN from branched ANFs with certain water content;

In another embodiment, dispersion of branched ANFs is extruded into water to form hydrogel to form fibers, sheets, and other shape-controlled manifestation of moldable 3DPNs based on branched ANFs; transforming the hydrogel into aerogel from branched ANFs forming 3DPN; molding the aerogel into desirable shape during or after its transformation from hydrogel;

Methods also involve incorporating the polymeric and nanoscale components into the hydrogel and aerogels from branched ANFs.

In another aspect, the suspension comprises 0.1-5 weight % branched ANFs in a mixture of DMSO, water and a base.

In another aspect, the method involves removing water from the hydrogel to make an aerogel comprising branched ANFs. In a particular aspect, it involves removing the water by extracting with supercritical carbon dioxide.

In another aspect, the method is carried out continuously.

In a second embodiment, a composite material comprises a polymer matrix and branched ANFs dispersed in the polymer matrix. In an aspect, there is an aerogel and a polymer in the pores of the aerogel, and the aerogel comprises branched ANFs. In a further aspect, the polymer comprises a cured epoxy resin.

In a third embodiment, a method of making a composite by layer-by-layer deposition process assisted by gelation of branched ANFs forming 3DPN involves
  a. a substrate coating step by a dispersion of branched ANFs on a substrate;
  b. phase transforming the coating of a. with a protic solvent to produce a hydrogel form of a 3DPN;
  c. penetrating precursors of a polymer dissolved in solvent or a solution of a formed polymer into the 3DPN of the product of step b;
  d. polymerizing the polymer precursors in situ in the case where precursors of the polymer are used in step c.; and
  e. removing the solvent from the product of step d.

In an aspect, the third embodiment involves steps a-e one or more times to build up a desired thickness of composite. The built-up step can be followed by delamination of the composite. The solvent comprises DMSO, water, and a base in a non-limiting aspect. In other aspects, the polymer precursors comprise an epoxy resin and an epoxy hardener. In various aspects, removing the solvent comprises extracting with supercritical carbon dioxide.

In a particular aspect, the method comprises
  a. spin coating a branched ANF dispersion in DMSO-based reaction media on a substrate
  b. exchanging DMSO-based reaction media with water to make a spun ANF-based film with the thickness exceeding 100 nm;
  c. removing excess liquid phase by spinning;
  d. spin coating an epoxy solution on top of the spun thin film with 3DPN morphology; and
  e. optionally repeating the above steps to build up a desired thickness.

In a fourth embodiment, a hydrogel comprises water and branched ANFs. In various aspects, the hydrogel is in the form of a fiber or of a thin sheet.

In one aspect, the nanofibers are characterized by a branched morphology.

In a fifth embodiment, an aerogel comprises branched ANFs.

EXAMPLES

Example 1—ANF Epoxy Composites—or ANF/EPX Composites

Branched ANF dispersion can be prepared by dispersing aramid microfiber (or commonly known as Kevlar fibers) in DMSO mixed with water and a base in specified concentrations. A subsequent solvent exchange with water leads to the formation of ANF hydrogel in a process step called phase transforming. In order to make a 3DPN in the form of ANF hydrogel coating, a thin liquid layer of branched ANF dispersion is spin-coated on a glass substrate and subjected to solvent exchange. The resulting thin ANF hydrogel can be carefully peeled off from the substrate (FIG. 23) and dried by supercritical $CO_2$ to examine the structure (FIG. 24). In a non-limiting example, the obtained 3DPN is 57 μm thick slab with a wide range of pores defined by interconnected ANFs (FIG. 25).

To make the ANF/EPX composites, the branched ANF hydrogel layer is left on the substrate to allow the diffusion of EPX. The hydrogel is adhesive enough to the substrate to allow EPX to diffuse into the three-dimensional percolated networks without causing wrinkles. 0.1-2% EPX in a water miscible solvent such as acetone is used. Extra EPX solution can be removed by spinning off the substrate. After coating, the substrate is put in the 100° C. oven for 2 min to pre-anneal the film by removing the solvent. Then, another cycle can take place with branched ANF hydrogel deposited on the solidified coating. The cycle can be repeated continuously to obtain the needed thickness, which is similar to the conventional LBL assembly.(7) The film made after nth cycle is denoted as [ANF/EPX]$_n$. A schematic of the LBL process is shown in FIG. 26.

The linear growth of the film is confirmed by absorbance and thickness change (FIG. 27-29). An absorbance band centered at 330 nm is shown for ANF/EPX film, and its intensity increases linearly with cycle number. A similar linear trend is observed for thickness, which can be finely tuned by the concentration of ANF and EPX. When concentrations are 0.1%, 0.2% or 1% for each component at the same spin rate of 1000 rpm, the average thickness per cycle is 7.5, 18, and 342 nm, respectively. This result demonstrates the gaLBL technique has thickness control from several to hundreds of nanometers per layer.

The 1% branched ANF solution is then focused on for the following investigations for the thick layer formed each cycle. EPX concentration is changed from 0.1 to 2% to control the ANF volume fraction in the composites. As is determined by thermal gravimetrical analysis, ANF weight fraction is 90%, 87%, 64% and 38% when EPX varies at 0.1%, 0.5%, 1% and 2%. TGA also demonstrates a high decomposition temperature of 250° C.

The ANF/EPX composite is typically transparent (FIG. 30). The transparency of [1% ANF/1% EPX]$_6$ is 88% at 700 nm (FIG. 31). High uniformity in the film is indicated by Fabry-Perot patterns displayed in the absorbance spectrum. The ANF/EPX composite films can also be easily delaminated from glass substrate using dilute HF.(8)

The obtained transparent freestanding film is flexible enough to be wrapped around a pen (FIG. 32). Fourier transform infrared spectroscopy (FTIR) confirms the chemical features of both ANF and EPX in the composite.

Figure 36:
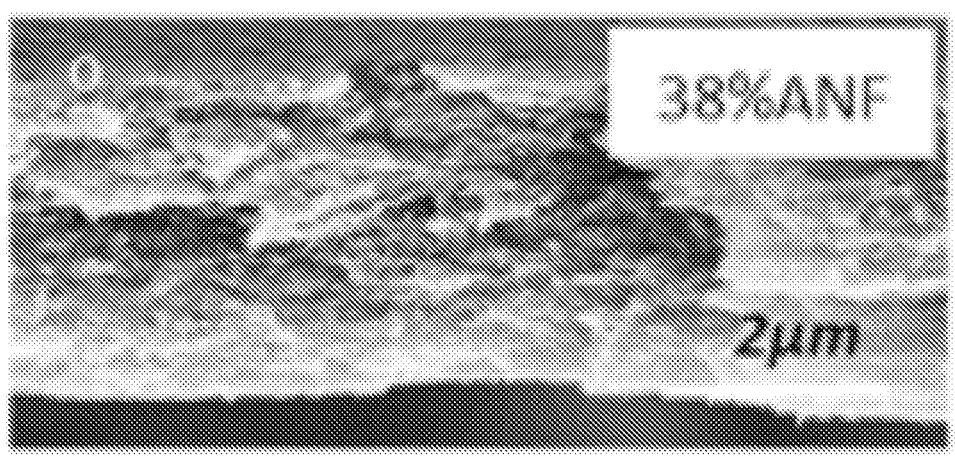

Under certain conditions, a stratification of ANFs (FIGS. 33-35) is observed in the composite, which is likely owing to the compression induced alignment during the collapse of the three-dimensional percolated network. With the increase of EPX in the composite, the layered structure becomes less distinct (FIG. 36). This observation indicates strong ANF-ANF interactions in the composites as a result of a branching morphology and abundant hydrogen bonds with amide functional groups. With such strong interactions, the strand of ANF under stress can easily transfer to other strands so that the whole neighboring network can be pulled out under load and then fractured. EPX here serves as crosslinks to ANF contacts when filling into the nanopores formed during the drying (FIG. 37). However, when EPX content is above a threshold, individual ANF can be completely surrounded by EPX. The ANF-ANF interaction is replaced by ANF-EPX-ANF interaction. The fracture then occurs at each individual ANF rather than the layered collective mode (FIG. 36). The overfilling of EPX is also evident in the abrupt jump of the film thickness from approximately 2 μm to 2.7 μm when 2%

EPX is used for infiltration. The surface of overfilled EPX composites is also less porous by appearance (FIG. 38 vs. FIG. 39). Those structural differences can influence the mechanical and thermal expansion properties of the composites.

Rather than the brittle behavior of micro-composites, the ANF/EPX composites are rather ductile, demonstrating a plastic deformation after the initial elastic region (FIG. 40). This characteristic is similar to those high performance aerospace alloys, such as titanium, steel or aluminum. In particular, [1% ANF/1% EPX]$_6$ shows an ultimate strength ($\sigma_u$) of 505±47 MPa, an ultimate strain ($\varepsilon_u$) of 0.16±0.03 with only a density ($\rho$) of 1.5±0.1 g/cm$^3$. The calculated toughness (K) by integrating the area under the stress/strain curve is 50.1±9.8 MJ/m$^3$. Similar to the micro-composites, the specific strength ($\sigma_u/\rho$) of this ANF/EPX composite is significantly larger than that of titanium, steel or aluminum alloys (FIG. 41). The absolute strength $\sigma_u$ is much higher than those of SAE 1010 steel (365 MPa) and 6061-T6 aluminum alloy (310 MPa). Although $\sigma_u$ of [1% ANF/1% EPX]$_6$ is not comparable to the $\sigma_u$ of unidirectional micro-composites in the alignment (0°) direction, it is 10 times and 16 times higher than the $\sigma_u$ in the 90° direction in traditional micro-composites respectively (FIG. 42). In addition, both the quasi-isotropic laminas of carbon and aramid fiber micro-composites are inferior in $\sigma_u$ (303 MPa and 141 MPa, respectively) to the ANF/EPX examined in this work, which is more intrinsically isotropic with the nanofiber reinforcement.

Such a high $\sigma_u$ for ANF/EPX composite, however, is not associated with the brittleness or low toughness that many composite materials have encountered. The toughness (K) of the ANF/EPX is 4 to 5 times higher than that of the unidirectional microcomposites measured in the 0° direction (FIG. 43). The K is also much higher than the layered composites made by alumina nanoplatelets(9) or carbon nanotube(8) with greater or comparable $\sigma_u$. It is believed that $\sigma_u$ and K are mutually exclusive properties in many cases.(10)

An optimum combination of both properties, however, is important for structural materials to avoid catastrophic failure under load. The solution to this dilemma relies on the design of hierarchical composite architecture similar to that in many natural materials. Here, the layered configuration of ANF, their strong interactions, and crosslinks formed by EPX lead to strong load-bearing ability. The collective layered failure mode plus the "stick-slip" interactions afforded by the hydrogen bond also facilitate energy dissipation during the stretching and thus high toughness.

More EPX or less in the composite leads to poorer mechanical performance than the [1% ANF/1% EPX]$_6$ (FIGS. 44 and 45). As is discussed above, this condition is a transition point at which nanopores start to get overfilled. This structural evolution directly affects the $\sigma_u$ and K, plus the storage modulus E' (FIG. 46), which is an indication of elastic stiffness of the material. All those properties show maxima for the film of [1% ANF/% EPX]$_6$ (FIG. 44-46).

Pure ANF film without EPX shows $\sigma_u$ of 387±25 MPa, $\varepsilon_u$ of 0.16±0.03, E' of 11.5±0.5 GPa, which are higher than those from VAF made ANF film ($\sigma_u$~160 MPa, $\varepsilon_u$~0.1, E~7.1).(11) The mechanical performance enhancement can result from this gaLBL processing technique. In VAF process, the long filtration step can lead to the deterioration of solution qualities, and thus the generation of defects in the final film. Additionally, hand-peeling the ANF film from the porous membrane can also break some film microstructures. In gaLBL, all those defects-introduction steps are avoided.

Besides, some mechanical factors in the spin coating process, such as the centrifugal and air shear force can usually lead to some degree of lateral chain orientation and stratification. These factors can lead to an improved mechanical performance for the gaLBL made film with the same chemical composition, but with the different microarchitecture.

The damping ratio, or tan $\delta$, which is the ratio between the loss modulus and storage modulus. Tan $\delta$ measures the degree to which a material dissipates the vibration energy into heat. High damping capacity is useful in many automotive and sporting goods applications. The carbon and aramid micro-composites typically have very low tan $\delta$ of 0.0024 and 0.018 respectively. The ANF/EPX composites show higher tan $\delta$ (FIG. 47). Interestingly, pure ANF film displays the largest tan $\delta$ over the range of 0.1-1 Hz. At 0.1 Hz, the tan $\delta$ of ANF film can be as high as 0.14, and is decreased to 0.06 at 1 Hz. With the addition of EPX, the tan $\delta$ gradually declines. The highest tan $\delta$ of pure ANF film can be related with the more freedom of ANFs in the periphery of abundant unfilled nanopores. The strong but unlocked ANF-ANF interfaces cause the high mechanical damping. With the introduction of EPX into the PNN, the touching interface is gradually locked by the poor-damping EPX to result in a lower tan $\delta$. [1% ANF/1% EPX]$_6$ has slightly lower tan $\delta$ of 0.11 at 0.1 Hz and 0.5 at 1 Hz. An significant drop of tan $\delta$ occurs for [1% ANF/2% EPX]$_6$, which has even smaller tan $\delta$ than EPX. This finding actually agrees with the previously discussed structure transition. In this film, ANF is surrounded by EPX with the interface of ANF-EPX-ANF. The dissipating mechanism relying on the ANF-ANF friction disappears here, while the ANF serves as reinforcing agent for EPX to make its chain even less mobile.

Low coefficient of thermal expansion (CTE) is another key feature for conventional carbon or aramid micro-composites. The low CTE can exhibit a better dimensional stability over a wide temperature range. Unidirectional carbon micro-composites have CTE of −0.44~0.16 ppm K$^{-1}$ in 0° direction, and 0.36 to 4.02 ppm K$^{-1}$ in 90° direction, while the quasi-isotropic ones have CTE of 0.36 to 4.02 ppm K$^{-1}$. On the other hand, unidirectional aramid micro-composites have CTE of −2.57 to −1.74 ppm K$^{-1}$ in 0° direction, and 21.4 to 27.5 ppm K$^{-1}$ in 90° direction, while the quasi-isotropic ones have CTE of 9.5 to 12.9 ppm K$^{-1}$. Here, [1% ANF/1% EPX]$_6$ can have the quasi-isotropic close-to-zero CTE of −0.9 ppm K$^{-1}$ until 220° C. (FIG. 48). With finer tuning, a real zero expansion can be achieved. It is interesting to notice that the aramid micro-composites have high positive CTE at 90° to the fiber direction, and this property contributes to the slightly lower but still positive CTE for quasi-isotropic composites. However, material made with ANF with the same chemical composition but much smaller diameter gives overall negative and even zero CTE.

This phenomenon is related with the existence of nanopores. Aramid microfiber is proved to have CTE of −4.9 ppm, agreeing with the previous studies. Pure ANF film shows two regimes of thermal expansion: one with CTE of −6 ppm K$^{-1}$ up to 75° C., and the other one with CTE of −0.5 ppm K$^{-1}$. Similar to graphene, the negative CTE in ANF is contributed by the transversal acoustic bending modes along the axis, or commonly known as the "membrane effect". The nanopores formed by the overlapping of ANFs give rise to more free space to enhance this bending effect, thus more negative CTE. With the increase of temperature, however, other phonon modes contributing to the positive CTE might take effect. The nanopores can also accommodate the positive radial expansion of ANF. In addition, since the mechanical load is carried mainly by the axial direction of the ANF, the overall CTE shows more axial behavior of ANF. With EPX in the composite, the thermal behavior is a combined effect of both components. When the nanopores are under-filled, the CTE increases a bit even with 36% EPX in the composites. When the nanopores are overfilled, such as in the film of [1% ANF/2% EPX]$_6$, the CTE has increased to 11 ppm. In this film, not enough space exists to accommodate the positive radial expansion, and EPX as a matrix can uniformly distribute the load to various directions in ANF. Accordingly, the radial expansion can contribute more to the overall CTE.

To conclude, a gaLBL based on ANF gels, method makes, as one example, transparent, strong and tough ANF/EPX composites with high damping and zero-expansion. The ultimate fracture strength of the composites is higher than that of quasi-intrinsic carbon or aramid microfiber reinforced composites (micro-composites). The toughness is even better than that of the unidirectional micro-composites. ANF/EPX composites with such combined functionalities can be used for bio-implants, packaging materials, electronic boards, bullet-proof windows and many more.

Example 2—3DPN's from ANF Hydrogels

High aspect ratio plus the branched morphology makes ANF a unique nanoscale material for forming the 3DPNs. The latter can be formed in the form of hydrogels using a solvent exchange process described above (FIGS. 10, 12 and 49). In a typical procedure, a layer of water is gently sited on top of the DMSO-based dispersion phase containing 1 wt % ANF. With the slow diffusion of water, the deprotonated aramid chains are gradually reverted to their initial chemical structures by abstracting protons from water, accompanied by a color change from dark red to light yellow. The attained hydrogel is highly robust, and can sustain structural integrity even after cutting and shearing with a razor blade (FIG. 11). To further reveal the internal structure of ANF in the hydrogel, it is converted into an aerogel through the supercritical CO$_2$ extraction (FIG. 13-15). As expected, the aerogel contains a network of highly branched ANF nanofibers entangled with each other. The ANF aerogel is ultralight with a measured density of 11 mg/cm$^3$ and adheres to electrified glass (FIG. 13). Additionally, it has a Brunauer-Emmet-Teller (BET) surface area as large as 275 m$^2$/g, which could be compared to aerogel from cellulose nanofibers with a BET area ranging from 20 to 66 m$^2$/g.

Figure 20:
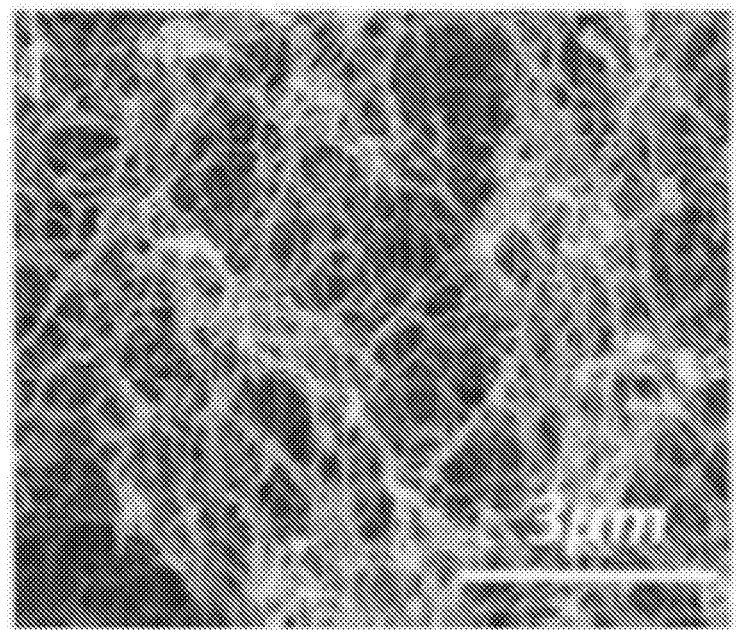

Another important feature of 3DPNs from branched ANFs percolated nanofiber network is its ability to be spun continuously through a simple setup (FIG. 17). With the constant flow of DI water, the continuously extruded 0.1 wt % ANF solution through an ultrafine needle can be rapidly converted to a fiber made of ANF 3DPNs (FIG. 18-20). Inside the fiber, ANF morphology is similar to those obtained by the static diffusion process. In addition, the dimension of the fiber approximates the size of hole in the needle, which indicates the minimal shrinkage during the phase transformation and supercritical drying process. This gel has an estimated density of 1.1 mg/cm$^3$, which is among the few materials. Considering no other 1D nanomaterials could form robust networks at such a low concentration, we conclude that the interconnection of ANF through the branched structure is the key to the formation of 3DPNs.

Further in-depth, the robustness of the ANF 3DPNs is substantiated by quantitatively evaluating their mechanical properties in respect to shear, compression and tension, which may further shed light on the role of the branched structure by comparing with other gels/3DPNs from non-branching nanomaterials.

The shear stress-strain curve of a 1% ANF hydrogel shows a linear viscoelastic region ending at strain amplitude of 10%, followed by a softening region where the hydrogel starts to break and flow (FIG. 50). The maximum stress at the turning point—often known as the critical shear strength ($\tau_c$)—indicates the mechanical robustness of the gel. ANF hydrogel shows $\tau_c$ of 2.95±0.05 kPa, which is much larger than that of graphene hydrogel ($\tau_c$=0.4 kPa) at a similar solid content. The dynamic shear test also separates the elastic and viscous contributions in terms of storage modulus (G') and loss modulus (G"). Agreeing with the linear region in FIG. 50, the G' is initially independent on the strain, and then decreases strains above 10% (FIG. 51). G" initially increases and then decreases, which reflects structural rearrangement in the materials for strains above 10%. G' varies little with the angular frequency from 0.06 to 60 rad/s remaining around 29 kPa at a fixed oscillatory strain of 1% (FIG. 52). By contrast, G" exhibits a shallow region with larger value at higher and lower frequency regions. The low frequency rise implies the existence of slow structural rearrangement process, while the high frequency rise is attributed to the viscous relaxation of water in the gel.

The rheological properties of hydrogel are mainly dependent on the intrinsic mechanical behavior of the constituents and their short or long range interactions. FIG. 53 shows a comparison between the hydrogel from branched ANFs and other hydrogels made of typical reinforcing nanomaterials with high crystalline elastic moduli. The hydrogels in comparison have a solid content around 1 wt %. Hydrogels from branched ANFs are more rigid than carbon nanotube or graphene hydrogels despite the latter has stiffer nanocomponents, which indicates stronger molecular affinity among those polymer nanofibers in the hydrogel. Moreover, hydrogel from branched ANFs has three times as high shear G' as the hydrogel from cellulose nanofibers despite their similar crystalline moduli, or hydrogen bonding interactions at the molecule level. Considering their morphological resemblance including fiber diameter or length, we can safely attribute the higher G' of hydrogels from branched ANFs to the interconnecting branched nanofiber percolating structure. Additional comparison of hydrogel from branched ANFs with other chemically crosslinked polymeric hydrogels, such as those made of polyacrylamide (PAM) or polyethylene glycol (PEG) with larger solid content also indicates its higher rigidity. This observation indicates the moduli of the ingredients in the network also contribute to the shear properties of the hydrogel in addition to the connectivity. Hydrogel from branched ANFs has both of the qualities.

Uniaxial compression and tension tests of the 3DPN from branched ANFs also indicate its high mechanical strength (FIG. 54-56). An interesting property of ANF 3DPN during compression is that both hydro- and aerogels can be compressed to strains over 90% without any cracks at the macro-, micro-, or nanoscale (FIG. 57-61) while typical graphene or cellulose networks develop macroscopic cracks or even fracture at a much smaller compressive strain. More importantly, the ANF tends to align in perpendicular to the direction of compressing stress, while the large void space in the network can accommodate those deformations and ensure a zero Poisson's ratio (FIGS. 57 and 61). The compressed aerogel also shows improved tensile properties due to the reduction of porosity (FIG. 56). All those properties would be advantageous for infiltration of matrix materials into the 3DPNs for fabricating high performance materials.

The uniform cross-section of all the fractured composites from branched ANFs over the thickness indicates the even distribution of ANF and EPX (FIGS. 29, 33-36), which are also proved by the surface morphologies of the network from branched ANFs embedded with EPX (FIGS. 38 and 39). Close examination of the cross-sectional images show a transition from a stratified ANF network, which is similar to the compressed ANF 3DPNs (FIG. 61), to a surface scattered with random individual ANF. The fractured surface of high content ANF composites (FIGS. 34 and 35) is analogous to that of the pure ANF film, indicating the similar failure mechanisms by breaking the strong ANF-ANF interactions. In other words, the intrinsic properties of highly branched ANF 3DPNs have a dominant contribution to the overall mechanical properties of the composite film with high ANF content. In addition, despite the addition of EPX, the thicknesses of those composites are almost invariant until a significant jump for ANF content of 38% (FIG. 62). EPX here plays a role of binder to ANF and ANF contacts with continual filling of the nano-porous ANF network. Above a certain threshold, EPX overfills the nanopores and becomes a dominant phase in the composites with a complete surrounding around ANF. The fracture then occurs at each individual ANF rather than the collective ANF pullout (FIG. 33-36). The surface of overfilled EPX composites is also less porous by appearance (FIG. 39). Those structural differences can influence on the mechanical and thermal expansion properties of the composites, which will be discussed below.

Thanks to the high intrinsic mechanical properties of ANF 3DPNs and the uniform composite structure afforded by gaLBL, the ANF/EXP composite shows interesting mechanical properties (FIG. 40). Overall, ANF/EPX composites are quite ductile with a plastic deformation after the initial elastic region. This characteristic is similar to those high performance aerospace alloys, such as titanium, steel or aluminum. Among those composites, [1% ANF/1% EPX]$_6$ demonstrates optimum performance with an ultimate strength ($\sigma_u$) of 505±47 MPa, an ultimate strain ($\varepsilon_u$) of 0.16±0.03 with only a density ($\rho$) of 1.5±0.1 g/cm$^3$. This observation in addition to the dynamical mechanical analysis (DMA) of those composites agrees well with the previous discussion of structural characterization of the composites. The initial improvement of mechanical properties is due to the lock-in effect of the EPX surrounding the ANF, and less defective sites as a result of filling the free space in the composites. The lock-in effect of EPX can be estimated from the decreasing damping ratio from the initial 0.14 for the pure ANF films. The excess EPX, however, leads to interface changes from ANF-ANF to ANF-EPX, which can weaken the material. In comparison to other common structural materials, the optimized ANF/EPX composites have higher specific strength ($\sigma_u/\rho$) than that of titanium, steel or aluminum alloys (FIG. 41). The absolute strength $\sigma_u$ of the ANF/EXP composite is much higher than those of SAE 1010 steel (365 MPa) and 6061-T6 aluminum alloy (310 MPa).

Example 3—Preparation of ANF Continuous Gel Fiber 0.1% ANF dispersion was extruded from a 28 G stainless steel needle at a rate of 3 ml/h into a flow of DI water with a rate of 12 ml/h. The continuous gel fiber was immediately formed at the tip of the needle and was guided into a 0.58 mm (ID) glass capillary tube, and then collected in a DI water reservoir. The flow rate control was achieved by syringe pumps, and soft silicone tubing was used to make the connection.

Example 4—Preparation of Thin Sheets from Branched ANF Gel

The 1% branched ANF dispersion was confined between two pieces of 2" by 3" clean glass slides at a distance of ~0.2 mm, and then put into water. The thickness of a gel film was controlled by a spacer between the glass slides or adapted to the weight placed on top of the glass slide balanced by the viscosity of branched ANF dispersion. Within 12 hours, 3DPN from branched ANF thin sheet gel can be peeled off from the glass slides under water. The gel was then transferred into fresh water for storage.

Example 5—Preparation of PVA/ANF Composite

Polymers can be impregnated into the 3DPNs from branched ANFs to facilitate stress transfer and improve the defect tolerance and toughness. Such impregnation can be easily implemented for 3DPNs from branched ANFs by immersing the aero/hydrogel into various solutions of required components. Polyvinyl alcohol (PVA) was selected as a soft matrix component due to its abundant —OH groups capable of hydrogen-bonding with ANFs. When the ANF gel was treated with 1 wt % PVA solution, the polymer chains adsorbed strongly onto the exposed surface of ANFs and long-term rinsing had little influence on the PVA content.

The ANF thin sheet hydrogel was immersed in 1 wt % PVA (Aldrich, Mowiol® 56-98, Mw about 195000) for 12 hours, and then rinsed with fresh water for 5 mins. The thin sheet was then carefully transferred onto a Teflon sheet and dried in 70° C. oven for 30 minutes.

The PVA-saturated gel was dried at 70° C. into a transparent solid film (FIGS. 63 and 64). The morphology of the resulting film can be described as interpenetrating PVA and ANF networks collapsed from the capillary force during the water removal (FIGS. 65 and 66). The irregular micro/nano pores (FIG. 66) in the structure left by this drying process, however, can act as scattering interfaces to reduce the light transmission. The light scattering can be minimized by filling these pores with transparent epoxy; the 1.25 µm thick film show to 86% transparency at 600 nm (FIG. 67)

ANFs content in the composite is 35 wt % of the as determined by TGA and DSC analysis. Their uniform distribution in the material can be easily observed in the cross-section image of the fractured composite (FIG. 65). FTIR spectra confirm the interactions between branched ANF and PVA (FIGS. 6-8). The presence of hydrogen bonds are revealed in the change in the $\gamma$(C=O) position. The band at 1646 cm$^{-1}$ for intra-ANF hydrogen-bond-influenced C=O does not change appreciably, but the other C=O band for inter-fiber hydrogen bonds is upshifted by 0.8 cm$^{-1}$ (FIG. 10H). This observation suggests that —OH groups from PVA compete with C=O as hydrogen acceptors, thus increasing the electron density in the C=O unit. The bending ($\delta$(CH$_2$)) and rocking modes ($\delta_R$(CH$_2$)) of —CH$_2$— groups disappear in the composite spectra. It is likely that the strong van der Waals interactions from phenylene groups in ANF limit the movement of —CH$_2$— units in PVA.

From the stress-strain curve, the PVA/ANF composite has $\sigma_u$=257±9 MPa and $s_u$=27±5%. The toughness of the PVA/ANF composite is 46±3 MJ/m$^3$ which is almost twice as high as that of Kevlar microfibers. In the previous studies, reasonably high $\sigma_u$ and $s_u$ parameters were attained through the more time- and labor-intensive bottom-up method, such as the laminated chitosan/alumina platelet composites with $\sigma_u$ of 315±95 MPa and $s_u$ of 21±5%, and LBL assembled PVA and CNT composites with $\sigma_u$ of 225±25 MPa and $s_u$ of 19±7%. The mechanical properties of PVA/ANF films described herein, made through a simple impregnation process, are comparable or surpass the properties of the existing composites just described.

The inclusion of ANF, which has an unusual negative coefficient of CTE in the axial direction, can greatly reduce the overall CTE of the composite. Below glass transition temperature ($T_g$), the PVA/ANF composite has a CTE of 1.9 ppm $K^{-1}$, which is smaller than most of the ceramics, such as glass, silicon and boron carbide. Above $T_g$, the composite has a CTE of 32 ppm $K^{-1}$, close to that of neat PVA in the glassy state.

Example 6—Spin-Coating gaLBL Process

2" by 2" glass slides were cleaned by immersion in Piranha solution (3:1 $H_2SO_4/H_2O_2$) for 12 h, then thoroughly rinsed with DI water prior to use. 1 ml 1% ANF dispersion was poured onto the substrate, and then spread uniformly all over the surface by spinning with a rate of 1000 rpm and an acl of 45 for 30 s. Then DI water was quickly dropped onto the surface, the color of the coating was immediately changed from orange to white, indicating the formation of thin layer hydrogel. The substrate then went through another spin at the same settings for 30 s to remove extra water. 1 ml 0.1~1% EPX in acetone was subsequently put on the hydrogel layer to allow infiltration, and a 30 s spin removed the extra EPX solution. After that, the glass slide was taken from the spin coater and put in the 100° C. oven for 2 min to allow pre-annealing. This complete cycle usually took 4 min. The above procedures could be repeated to put another ANF/EPX layer on top. Typically, films made after 6 cycles of deposition were used for property measurements. The samples finally went through an overnight annealing at 70° C. to completely cure the EPX and remove the solvent. The freestanding films were delaminated from glass substrate with the aid of 1% HF. For thickness measurement by ellipsometry, silicon rather than glass was used, and other procedures were kept the same.

Example 7—Estimation of Porosity in the Aerogel

The porosity was estimated by the following equation:

$$\text{Porosity} = 1 - \frac{\rho_{gel}}{\rho_{solid}}$$

in which, $\rho_{gel}$ and $\rho_{solid}$ are the density of the aerogel and its constituent respectively. The following density is used for the comparison purpose in the main text: Kevlar (1.44 g/cm3), Cellulose (1.5 g/cm3), Carbon nanotube (1.3 g/cm3), graphene (2.26 g/cm3), Polyethylene Glycol (1 g/cm3), Agarose (1.2 g/cm3).

Example 9—Characterization

The transparency of film was determined by an 8453 UV-vis ChemStation spectrophotometer from Agilent Technologies. Cross-section and morphology of the film were examined by FEI NOVA Nanolab Scanning electron microscopy (SEM) or JEOL 2100F S/TEM. Tapping mode atomic force microscopy (AFM) images were obtained using a NanoScope IIIa Atomic force microscope (AFM) from Veeco Instruments.

Differential scanning calorimetry (DSC) was carried out on a TA instrument Discovery DSC under nitrogen atmosphere at a temperature ramp rate of 20° C./min. To eliminate thermal history, the samples went through steps of heating-cooling-heating according to the protocol in ASTM D3418-08. The second heating step was used for analysis. PVA content can then be estimated by comparing the PVA melt enthalpy in the composite with that in pure PVA. Thermal gravimetrical analysis (TGA) was run on a TA instrument Discovery TGA with a heating rate of 10° C./min in nitrogen. Coefficient of thermal expansion (CTE) of films was measured using extension mode in Perkin Elmer TMA7, following ASTM *Test Method for Linear Thermal Expansion of Solid Materials by Thermomechanical Analysis* (E 831) and slightly modified to measure the thin film. The extension probe and grips were customized by RT instruments, Inc. to minimize the expansion of grips during the measurement. A ramp rate of 5° C./min was used and the second heating step was used for analysis.

The rheological (shear) measurement was conducted on a TA Instruments' AERS rheometer with a 25 mm cone-plate geometry at 25° C. Dynamic frequency sweep experiments were set from 0.06 to 60 rad/s at a fixed oscillatory strain of 1%. The strain sweep experiments were set from 0.1% to 100% at a fixed frequency of 6 rad/s. The samples were covered with a thin layer of silicon oil to prevent evaporation of water. Uniaxial tensile testing was done on RSAIII Rheometrics Systems Analyzer from TA instruments. The tensile tests confirm to the ASTM standard ASTM D882. In a typical measurement, a 1 mm wide and 6 mm long sample strip was fixed onto the steel grips. The Kevlar microfiber was fixed by super-gluing the ends onto two pieces of stainless steel metal sheets separated by a distance of 6 mm. The metal sheets were then put between the grips for measurement. The test speed was 0.01 mm/s.

Example 9—Mechanical Properties of 3DPNs from Branched ANFs

Branched ANF hydrogels and aerogels also exhibit satisfying performance in the compression, test. The compressive strain-stress curves show three stages typical for porous materials (FIG. 54). The linear elastic stage was observed initially, then the material reached its elastic limit, at which point the 3DPNs started to yield at a nearly constant stress. This plateau stage is followed by a densification region where the porous network starts to collapse. Both gels can be compressed to strains over 90% without any cracks at the macro-, micro-, or nanoscale (FIGS. 59-61). Other 3DPNs exhibit substantially higher brittleness. For example, graphene hydrogels show micro-cracks and stress discontinuity at a strain of 42%, and cellulose aerogels become completely fractured at 68% strain.

The compressive modulus E and yield stress $\sigma_y$ for the ANF hydrogel are 57±3 kPa and 8±1 kPa. ANF aerogel has twice higher values, E=90±5 kPa and $\sigma_y$=18±1 kPa. Note, however, the plasticization effect of water on ANF hydrogel is less pronounced as for other 3DPNs. For example, highly porous (>99%) hydrogels from cellulose nanofibers and carbon nanotubes are so compliant that they are reminiscent of a viscous fluid. Their 3D structure is disturbed by swelling in water and/or agitation. Instead, the ANF gels are stable in water for over a year without any visible fluidization. Even intensive sonication cannot destroy their structural integrity, while other un-crosslinked cellulose nanofibers and carbon nanotubes cannot survive the same treatment.

A comparison of the compressive properties of 3DPNs from branched ANFs to other commonly used reinforcing networks in the form of aerogels is revealing about the advantages and utility of this technology. The E of aerogel from branched ANFs is similar to cellulose nanofibers or carbon nanotube aerogels, but two orders of magnitude higher than graphene aerogel at similar density. The similarity is likely due to the insufficient load transfer between the ligaments during the compression, unlike the network deformation during the shearing. The nanofibers or nanotubes are likely to buckle or dislocate under the stress due to their small diameters, as the bending modulus is of the order of $E_{fiber}d^4$, in which $E_{fiber}$ and d are elastic modulus and diameter of the fiber. The graphene aerogel is especially prone to be bent due to its extreme thinness (~1 nm).

Toughness is one of the key properties determining most applications of load-bearing and other materials. Importantly, 3DPNs from branched ANFs show high toughness in compression with 25 kJ/m³ and 78 kJ/m³ for hydrogel and aerogel, respectively. This property is higher than carbon nanotube and cellulose nanofibers aerogels, and some polymeric gels with much higher solid content (Table 1).

the film. The densified 3DPNs from branched ANFs have ultimate stress comparable to $\sigma_u$ of buckypaper from carbon nanotubes but with seven times higher ultimate strain.

Example 10—Dynamic Mechanical Analysis of ANF/EPX Composites with 3DPN from Branched ANFs Another interesting property in dynamic mechanical properties measurement (FIGS. 46 and 47) is the damping ratio or tan δ, which is the ratio between the loss modulus and storage modulus. Tan δ measures the degree to which a material dissipates the vibration energy into heat. High damping capacity is useful in many automotive and sporting goods applications. The carbon and aramid micro-composites typically have very low tan δ of 0.0024 and 0.018 respectively. The ANF/EPX composites show higher tan δ (FIG. 47). Interestingly, pure ANF film displays the largest tan δ over the range of 0.1-1 Hz. At 0.1 Hz, the tan δ of ANF film can be as high as 0.14, and is decreased to 0.06 at 1 Hz. With the addition of EPX, the tan δ gradually declines. The highest tan δ of pure ANF film can be related with the more freedom of ANFs in the periphery of abundant unfilled nanopores. The strong but unlocked ANF-ANF interfaces cause the high mechanical damping. With the introduction of EPX into the 3DPN, the touching interface is gradually

TABLE 1

Comparison of mechanical properties of various hydrogels.

| | | Compression | | | Tension | | | |
|---|---|---|---|---|---|---|---|---|
| | Solid Content (wt %) | Yield Strength (kPa) | Modulus (kPa) | Toughness (kJ/m3) | Young's Modulus (kPa) | Strain (%) | Stress (kPa) | Toughness (kJ/m3) |
| Graphene Hydrogel | 0.9 | 3 | 29 | — | — | — | — | — |
| BC cellulose Hydrogel | 10 | — | 7 | — | 2900 | 21 | 2200 | 150 |
| Agarose Hydrogel | 2.25 | — | 28 | 0.2 | — | — | — | — |
| PEG Hydrogel | 7.34 | — | 36 | 37 | — | — | — | — |
| PEG Hydrogel | 25 | — | — | — | 23.1 | 53 | 12 | 3 |
| Kevlar Hydrogel | 1 | 8 ± 1 | 57 ± 3 | 25 ± 2 | 230 ± 18 | 13 ± 2 | 24 ± 4 | 1.3 ± 0.1 |

The Young's modulus $E_y$, ultimate stress $\sigma_u$, and ultimate strain $s_u$ of hydrogel from branched ANFs in tension are 230±18 kPa, 24±4 kPa, and 13±2%. The same parameters for ANF aerogel are $E_y$=750±10 kPa, $\sigma_u$=90±7 kPa, and $s_u$=12±3%. The Young's modulus ($E_y$) of the 3DPNs from branched ANFs in extension is much higher than that obtained in compression. Due to the fluidity of cellulose nanofibers, carbon nanotubes, and graphene hydrogels at similar solid content, their tensile properties are not available to compare. Still, the $E_y$ of hydrogel from branched ANF is 10 times higher than that PEG hydrogels with much higher solid content (Table 1).

From the practical perspective, it might be useful to increase tensile properties sacrificing the porosity. After aerogel from branched ANFs is compacted into ⅙th of its initial volume, it displays $E_y$, $s_u$, and $\sigma_u$ of 16±2 MPa, 11±2%, and 1.3±0.7 MPa, respectively. These properties can be further improved to 136±11 MPa, 7±2%, and 6.2±0.5 MPa when the aerogel is further compressed. Such enhancement is likely to originate from the increased density of hydrogen-bonding crosslinks and the nanofiber alignment in locked by the poor-damping EPX to result in a lower tan δ. [1% ANF/1% EPX]$_6$ has slightly lower tan δ of 0.11 at 0.1 Hz and 0.05 at 1 Hz. An significant drop of tan δ occurs for [1% ANF/2% EPX]$_6$, which has even smaller tan δ than EPX (FIG. 47). This finding actually agrees with the previously discussed structure transition. In this film, ANF is surrounded by EPX with the interface of ANF-EPX-ANF. The dissipating mechanism relying on the ANF-ANF friction disappears here, while the ANF serves as reinforcing agent for EPX to make its chain even less mobile.

REFERENCES

1. S. Deville, E. Saiz, R. K. Nalla, A. P. Tomsia, Freezing as a Path to Build Complex Composites. *Science* (80-.). 311 (2006).
2. K. H. Kim, M. Vural, M. F. Islam, Single-Walled Carbon Nanotube Aerogel-Based Elastic Conductors. *Adv. Mater.* 23, 2865-2869 (2011).
3. S. Stankovich, D. A. Dikin, G. H. B. Dommett, K. M. Kohlhaas, E. J. Zimney, E. A. Stach, R. D. Piner, S. T. Nguyen, R. S. Ruoff, Graphene-based composite materials. *Nature*. 442, 282-286 (2006).

4. Y. Kim, J. Zhu, B. Yeom, M. Di Prima, X. Su, J.-G. Kim, S. J. Yoo, C. Uher, N. A. Kotov, Stretchable nanoparticle conductors with self-organized conductive pathways. *Nature*. 500, 59-63 (2013).
5. Z. Spitalsky, G. Tsoukleri, D. Tasis, C. Krontiras, S. N. Georga, C. Galiotis, High volume fraction carbon nanotube-epoxy composites. *Nanotechnology*. 20, 405702 (2009).
6. J. Suhr, N. Koratkar, P. Keblinski, P. Ajayan, Viscoelasticity in carbon nanotube composites. *Nat. Mater.* 4, 134-137 (2005).
7. G. Decher, Fuzzy Nanoassemblies: Toward Layered Polymeric Multicomposites. *Science* (80-.). 277, 1232-1237 (1997).
8. B. S. Shim, J. Zhu, E. Jan, K. Critchley, S. Ho, P. Podsiadlo, K. Sun, N. A. Kotov, Multiparameter Structural Optimization of Single-Walled Carbon Nanotube Composites: Toward Record Strength, Stiffness, and Toughness. *ACS Nano*. 3, 1711-1722 (2009).
9. L. J. Bonderer, A. R. Studart, L. J. Gauckler, Bioinspired Design and Assembly of Platelet Reinforced Polymer Films. *Science* (80-.). 319, 1069-1073 (2008).
10. R. O. Ritchie, The conflicts between strength and toughness. *Nat. Mater.* 10, 817-822 (2011).
11. K. Cao, C. P. Siepermann, M. Yang, A. M. Waas, N. A. Kotov, M. D. Thouless, E. M. Arruda, Reactive Aramid Nanostructures as High-Performance Polymeric Building Blocks for Advanced Composites. *Adv. Funct. Mater.* 23, 2072-2080 (2013).

The invention claimed is:
1. A method comprising:
 a. preparing branched ANFs suspended in an aprotic solvent with addition of reaction media, the reaction media comprising a protic component and a base, preparing the branched ANFs leading to splitting of micro- and microscale fibers of polymers into nanofibers with branched morphology;
 b. the diameter of the nanofibers not exceeding 100 nm;
 c. wherein high monodispersity of the nanofibers has a diameter distribution controlled by the reaction media and such that 90% of the nanofibers are distributed within 20 nm of a mean diameter of the nanofibers;
 d. wherein branching of the nanofibers is controlled by an amount of the protic component in the reaction media and/or a composition of the base such that the number of branches for each nanofiber varies between 3 and 20;
 e. transforming a suspension of the branched ANFs by diffusing water, other protic solvent, or a mixture of the water and the other protic solvent, into the suspension to make a hydrogel comprising the branched ANFs assembled into three-dimensional percolated networks (3DPNs);
 f. wherein transforming the suspension comprises extruding the hydrogel or the suspension of the branched ANFs to form a manifestation of moldable 3DPNs based on the branched ANFs;
 g. transforming the hydrogel into an aerogel;
 h. molding of the aerogel into a shape during or after transformation from the hydrogel; and
 i. incorporating polymeric and nanoscale components into the hydrogel or the aerogel.
2. The method according to claim 1, wherein:
 the aprotic component comprises dimethyl sulfoxide (DMSO);
 the protic component comprises water; and
 the base comprises KOH or EtOK.
3. The method according to claim 1, wherein the suspension comprises 0.1-5 weight % branched ANFs.
4. The method according to claim 1, further comprising removing the water from the hydrogel to make an aerogel comprising branched ANFs.
5. The method according to claim 4, wherein removing the water comprises extracting with supercritical carbon dioxide.
6. The method according to claim 1, wherein the method is carried out continuously.
7. A composite material comprising:
 a polymer matrix;
 branched ANFs dispersed in the polymer matrix;
 an aerogel comprising pores; and
 a polymer in the pores of the aerogel;
 wherein the aerogel comprises the branched ANFs.
8. The composite material according to claim 7, wherein the polymer comprises a cured epoxy resin.

* * * * *